(12) United States Patent
Manico et al.

(10) Patent No.: US 7,855,810 B2
(45) Date of Patent: Dec. 21, 2010

(54) METHOD FOR AUTOMATICALLY ORGANIZING A DIGITIZED HARDCOPY MEDIA COLLECTION

(75) Inventors: Joseph A. Manico, Rochester, NY (US); John R. Fredlund, Rochester, NY (US); Alexander C. Loui, Penfield, NY (US)

(73) Assignee: Eastman Kodak Company, Rochester, NY (US)

( * ) Notice: Subject to any disclaimer, the term of this patent is extended or adjusted under 35 U.S.C. 154(b) by 1072 days.

(21) Appl. No.: 11/111,365

(22) Filed: Apr. 21, 2005

(65) Prior Publication Data

US 2006/0198559 A1 Sep. 7, 2006

Related U.S. Application Data

(60) Provisional application No. 60/654,319, filed on Feb. 18, 2005.

(51) Int. Cl.
*H04N 1/40* (2006.01)
*G06K 15/00* (2006.01)
*G06K 9/54* (2006.01)

(52) U.S. Cl. ............... 358/3.28; 358/1.18; 382/305
(58) Field of Classification Search ........... 358/3.28, 358/474; 707/7
See application file for complete search history.

(56) References Cited

U.S. PATENT DOCUMENTS 6,154,295 A * 11/2000 Fredlund et al. ........... 358/487
6,351,321 B1 2/2002 McIntyre et al.
6,351,556 B1 2/2002 Loui et al.
6,606,411 B1 8/2003 Loui et al.
6,636,648 B2 10/2003 Loui et al.
6,745,186 B1 6/2004 Testa et al.
6,748,533 B1 * 6/2004 Wu et al. ................... 713/176
6,854,643 B2 * 2/2005 Manico et al. .............. 235/375
7,260,587 B2 * 8/2007 Testa et al. ............... 707/104.1
7,317,563 B2 * 1/2008 Kinjo ........................ 358/540
2004/0117215 A1 * 6/2004 Marchosky .................. 705/3
2005/0119997 A1 * 6/2005 Wesinger et al. ............ 707/3
2005/0157343 A1 * 7/2005 Tani et al. .................. 358/1.18
2005/0160271 A9 * 7/2005 Brundage et al. .......... 713/176

FOREIGN PATENT DOCUMENTS

| EP | 0735420 | 10/1996 |
|---|---|---|
| EP | 1182859 | 2/2002 |
| EP | 1335576 | 8/2003 |
| JP | 2001339597 A | * 12/2001 |
| JP | EP-1335576 | * 8/2003 |

* cited by examiner

*Primary Examiner*—Mark K Zimmerman
*Assistant Examiner*—Mesfin Getaneh
(74) *Attorney, Agent, or Firm*—Frank Pincelli; Raymond L. Owens

(57) ABSTRACT

A method, system and software program for automatically organizing digital images obtained from a plurality of hardcopy media. A plurality of hardcopy media are scanned so as to obtain both the image side and non-image side the of hardcopy media including capturing any watermark present on non-image side. The watermark on the non-mage side is used for automatically organizing digital images.

35 Claims, 15 Drawing Sheets

METHOD FOR AUTOMATICALLY ORGANIZING A DIGITIZED HARDCOPY MEDIA COLLECTION

CROSS REFERENCE TO RELATED APPLICATIONS

This is a 111A application of Provisional Application Ser. No. 60/654,319 filed Feb. 18, 2005.

FIELD OF THE INVENTION

The present invention relates to organizing digital images obtained from scanned hardcopy prints.

BACKGROUND OF THE INVENTION

Consumers today are switching from film-based chemical photography to digital photography in increasing numbers. The instantaneous nature of image capture and review, the ease of use, numerous output and sharing options, multimedia capabilities, and on-line and digital media storage capabilities have all contributed to consumer acceptance of this technological advancement. A hard drive, on-line account, or a DVD can store thousands of images, which are readily available for printing, transmitting, conversion to another format, conversion to another media, or used to produce an image product. Since the popularity of digital photography is relatively new the majority of images retained by a typical consumer usually takes the form of hardcopy media. These legacy images may span decades of time and have a great deal of personal and emotional importance to the collection's owner. In fact, these images often increase in value to their owners over time. Thus even images that were once not deemed good enough for display are now cherished. These images are often stored in boxes, albums, frames, or even their original photofinishing return envelopes.

Getting a large collection of legacy images into a digital form is often a formidable task for a typical consumer. The user is required to sort through hundreds of physical prints and place them in some relevant order, such as chronology or sorting by event. Typically events are contained on the same roll of film or across several rolls of film processed in the same relative time frame. After sorting the prints the user would be required to scan the media to make a digital version of the image. Scanning hardcopy image media such as photographic prints to obtain a digital record is well known. Many solutions currently exist to perform this function and are available at retail from imaging kiosks and digital minilabs and at home with "all-in-one" scanner/printers or with personal computers equipped with media scanners. Some media scanning devices include media transport means, simplifying the task of scanning hardcopy media. Using any of these systems requires that the user spend time or expense converting the images into a digital form only to be left with the problem of providing some sort of organizational structure to the collection of digital files generated.

The prior art teaches sorting scanned hardcopy images by physical characteristics. However, this grouping would be limited to coarse groupings of images and a general chronological sequence, which may be inadequate for very large image collections and may not be as useful as smaller groupings. What is needed is a system to rapidly convert large volumes of hardcopy media images into digital form and to automatically organize them into an improved chronological order and more accurate event groupings. This will provide a way for a consumer to easily and affordably obtain a digital version of a hardcopy image collection that will be a high quality presentation provided with a meaningful context.

U.S. Pat. No. 6,745,186 entitled PRODUCT AND METHOD FOR ORGANIZING AND SEARCHING DIGITAL IMAGES describes methods of organizing digital images by sorting or organizing scanned hardcopy images by physical characteristics including shape, size, cut, texture, border or finish.

U.S. Pat. No. 6,606,411 entitled METHOD FOR AUTOMATICALLY CLASSIFYING IMAGES INTO EVENTS describes methods for separating a group of images into events on the basis of time or date. Long lapses of time are used as event boundaries. Thus, when grouping images for output products like albums or for organizing a database of images, the images are grouped by similar time stamps.

U.S. Pat. No. 6,636,648 entitled ALBUMING METHOD WITH AUTOMATIC PAGE LAYOUT describes methods for laying out album pages on the basis of time or date and content. What is meant by content in this patent is a basic image analysis that identifies similar colorations such as histograms.

U.S. Pat. No. 6,351,321B1 entitled DATA SCANNING AND CONVERSION SYSTEM FOR PHOTOGRAPHIC IMAGE REPRODUCTION describes methods for identifying camera exposed information such as date/time/exposure conditions on digitized print images and employing techniques to edit out, crop, enhance, and replace the camera exposed information.

While some of the forgoing patents provide some help in organizing images, there still is a need to provide further efficient techniques for automatically organizing images into further defined groupings.

SUMMARY OF THE INVENTION

In accordance with one aspect of the present invention there is provided a method for automatically organizing digital images obtained from a plurality of hardcopy media that have been digitally scanned so as to obtain digital images, comprising the steps of:

a. scanning both the image side and non-image side of the plurality of hardcopy media so as to obtain a digital record of images on the image side and any watermark present on the non-image side;

b. using the watermark on non-image side for automatically organizing digital images.

In accordance with another aspect of the present invention there is provided a system for organizing digital images obtained from a plurality of hardcopy media, comprising:

a. a scanner for scanning both the image side and non-image sides of the plurality of hardcopy media so as to obtain a digital record of images on the image side and any watermark present on the non-image side;

b. a computer having a software program for use in analyzing the watermark on the non-image side of the plurality of hardcopy media for automatically organizing the digital images.

In accordance with yet another aspect of the present invention there is provided a software program for use on a computer such that when loaded on the computer will cause the computer to perform the following steps:

a. obtaining digitally scanned data of the image side and non-image sides of a plurality of hardcopy media so as to obtain a digital record of the image on the image side and any watermark present on the non-image side;

b. analyzing the watermark on the non-image side of the plurality of hardcopy media and automatically organizing the digital images into groups.

These and other aspects, objects, features and advantages of the present invention will be more clearly understood and appreciated from a review of the following detailed description of the preferred embodiments and appended claims and by reference to the accompanying drawings.

BRIEF DESCRIPTION OF THE DRAWINGS

In the detailed description of the preferred embodiments of the invention presented below, reference is made to the accompanying drawings in which.

DETAILED DESCRIPTION

Figure 1:
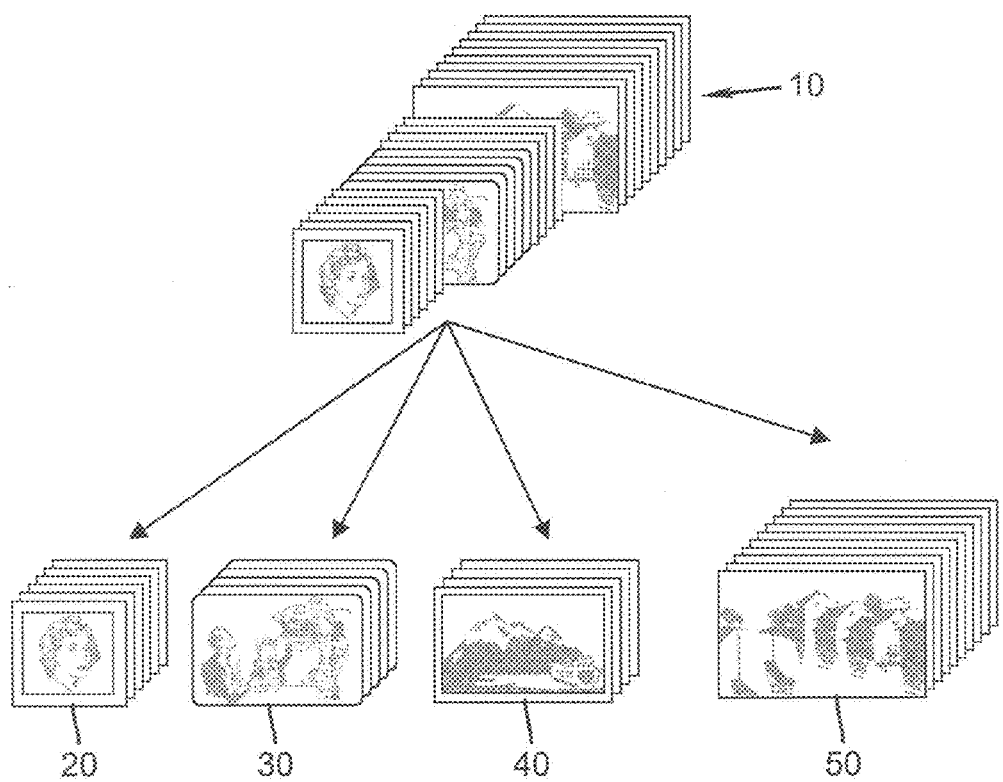
FIG. 1 is an illustration of prior art reference depicting a system that sorts hardcopy media images using the physical characteristics obtained from the image bearing hardcopy media.

Hardcopy media collections include optically and digitally exposed photographic prints, thermal prints, electro-photographic prints, inkjet prints, slides, and negatives. All of these hardcopy media types can be viewed by the human eye, but negatives are more difficult to see because they usually have colored filter mask and are reverse imaged. Over time hardcopy media collections grow and media of various forms and formats are added to various consumer selected storage techniques such as boxes, albums, file cabinets, and the like. Some users keep the photographic prints, index prints, and film negatives from individual rolls of film in their original photofinishing print return envelopes. Other users remove the prints and they become separated from index prints and film negatives and become combined with prints from other rolls. Users typically record one or more events on a roll of film such as a birthday celebration, a family reunion, a holiday, or a sporting event. If images of an event become separated and mixed in with hardcopy images from other events it becomes a daunting task for the user to reestablish the original image event groupings and chronological sequences. If the user desires to find an individual image or group of images from a particular time frame or event in order to reminisce or to commemorate the event or use the desired images to create an image product, it requires a significant investment of the user's time and effort. The user could even fail to recall elements of the event or its participants and could fail to realize that images belong with a given event grouping. Users may also inherit an unorganized family photographic collection and be unfamiliar with the events and chronology that would give context and meaning to the images. This organizational structure becomes more important as image collections grow in size and time frame. If the hardcopy image collection is large, including thousands of images, and is converted to digital form, an organizational structure such as a file structure, searchable database, or navigational interface is required in order to establish usefulness.

Photographic print media and the like have image and non-image surfaces and often include a manufacturer's watermark on the non-imaging surface of the media. The media manufacturer prints watermarks on "master rolls" of media, which are slit into smaller rolls suitable for use in photo processing equipment such as kiosks, minilabs, and digital printers. Manufacturers change watermarks from time to time as new media types with new characteristics, features and brand designations are introduced to the market. Watermarks are used for promotional activities, such as advertising manufacturer sponsorships, to designate special photofinishing processes and services, and to incorporate market specific characteristics such as foreign language translations for sale in foreign markets. Watermarks are typically non-photographically printed on the non-image surface of the media with a subdued density and can include text of various fonts, graphics, logos, color variations, multiple colors, and typically run diagonally to the media roll and cut print shape.

Manufacturers also include slight variations to the master roll watermarks such as adding a line above or below a designated character in the case of an alphanumeric watermark. This coding technique is not obvious or even apparent to the user but is used by the manufacturer in order to monitor manufacturing process control or to identify the location of a manufacturing process problem if a defect is detected. Different variations are printed at set locations across the master media roll. When finished rolls are cut from the master roll they retain the specific coded watermark variant applied at that relative position along the master roll. In addition, manufacturers maintain records of the various watermark styles, coding methodologies, and when specific watermark styles were introduced into the market. In testing with actual consumer hardcopy media it has been determined that watermark variations including manufacturer watermarks with special process control coding provided a very effective means to determine original film roll printing groupings. Once hardcopy media images are separated into original roll printing groups, image analysis techniques can be used to further separate the roll groupings into individual events. Watermark analysis can also be used to determine printing sequence, printing image orientation, and the time frame in which the print was generated.

A typical photofinishing order, such as processing and printing a roll of film will, under most circumstances, be printed on media from the same finished media roll. If a media roll contains a watermark with a manufacturer's variant code and is used to print a roll of film negatives, the resulting prints will have a watermark that will most likely be unique within a user's hardcopy media collection. An exception to this may be if a user had several rolls of film printed at the same time by the same photofinisher, as with film processed at the end of an extended vacation or significant event. However, even if the photofinisher had to begin a new roll of print paper during printing a particular customer's order, it is likely that the new roll will be from the same batch as the first. Even if that is not the case, the grouping of the event, such as a vacation, into two groups on the basis of differing back prints is not catastrophic.

New media types with unique watermarks are released to the market by the media manufacturer on an ongoing basis. Digital image scanning system can convert these watermarks into digital records which can be analyzed using Optical Character Recognition or OCR and/or digital pattern matching techniques. This analysis is directed at identifying the watermark so that the digital record can be compared to the contents of Look Up Tables (LUT's) provided by the media manufacturer. Once identified, the scanned watermark can be used to provide a date of manufacture or sale of the print media. The image obtained from the image side of the hardcopy media is sometimes provided with a date designation such as the markings from a camera date back, which can be used to establish a time frame for the scanned hardcopy media image without intervention from the user.

If a hardcopy media/print has an unrecognized watermark style, that watermark pattern is recorded and used for sorting purposes. If a photofinisher or user applied date or other information indicative of an event, time frame, location, subject identification, or the like is detected, that information would be incorporated into the LUT and used to establish a chronology or other organizational structure for subsequent images including the previously unidentified watermark. If a user or photofinisher applied date is observed on that hardcopy media print, that date can be added to the LUT. The automatically updated LUT can now use this new associated date whenever this unknown watermark style is encountered. This technique can be deployed to establish a relative chronology for hardcopy image collections that usually span decades.

Another technique uses the physical format characteristics of hardcopy media that can be correlated to the film systems that were used to create them and the time frames that these film systems were in general use. Examples of these formats and related characteristics include the Instamatic (a trademark of the Eastman Kodak Company) Camera and 126 film cartridge introduced in 1963 produced 3.5 inch×3.5 inch (8.89 cm×8.89 cm) prints and was available in roll sizes of 12, 20, and 24 frames. The Kodak Instamatic Camera 110 film cartridge introduced in 1972 produced 3.5"×5" (8.89 cm×12.7 cm) prints and was available in roll sizes 12, 20, and, 24 frames. The Kodak Disc Camera and Kodak Disc film cartridge was introduced in 1982 and produced 3.5"×4.5" (8.89 cm×11.43 cm) prints with 15 images per Disc. Kodak, Fuji, Canon, Minolta and Nikon introduced the Advanced Photo System or APS in 1996. The camera and film system had the capability for user selectable multiple formats including Classic, HDTV, and Pan producing prints sizes of 4"×6", 4"×7", and 4"×11" (10.16 cm×15.24 cm, 10.16×17.78 cm, 10.16×27.94 cm). Film roll sizes were available 15, 25, and 40 frames and index prints containing imagettes of all images recorded on the film were a standard feature of the system. The APS system has a date exchange system allowing the manufacturer, camera, and photofinishing system to record information on a clear magnetic layer coated on the film. An example of this data exchange was that the camera could record the time of exposure and the user selected format on the film's magnetic layer which was read and used by the photofinishing system to produce the print in the desired format and record the time of exposure, frame number, and film roll ID# on the back of the print and on the front surface of a digitally printed index print. 35 mm photography has been available in various forms since the 1920's to present and has maintained popularity until the present in the form of "One Time Use Cameras". 35 mm systems typically produce 3.5" (8.89 cm)×5" (12.7 cm) or 4" (10.16 cm)×6" (15.24 cm). Prints and roll sizes are available in 12, 24, 36 frame sizes. "One Time Use Cameras" has the unique characteristic in that the film is "reverse wound" meaning that the film is wound back into the film cassette as pictures are taken producing a print sequence opposite to the normal sequence. Characteristics such as physical format, expected frame count, and imaging system time frame can all be used to organize scanning hardcopy media into meaningful events, time frames, and sequences.

As with traditional photography, instant photography systems also changed over time. For example the Instant film SX-70 format was introduced in the 1970's, the Spectra system, Captiva, I-Zone systems were introduced in the 1990's, each of which had a unique print size, shape, and border configuration.

Referring now to FIG. 1 an illustration of prior art technique that sorts hardcopy media images using the physical characteristics obtained from the image bearing hardcopy media. Unorganized collection hardcopy media 10 consists of print media of various sizes and formats. This collection is converted to digital form with a media scanner capable of duplex scanning, not shown. If prints are provided in a "loose form" such as with prints in a shoebox it is preferable to use a scanner with an automatic print feed and drive system. If hardcopy media is provided in albums or in frames, a page scanner or digital copy stand should be used so as not to disturb or potentially damage the hardcopy media.

Once digitized the images are separated into designated subgroups based on physical size and format determined from the image data recorded by the scanner. Existing media scanners, such as the KODAK i600 Series Document Scanners automatically transports and duplex scans hardcopy media and includes image processing software and provides automatic de-skewing, cropping, correction, text detection, and Optical Character Recognition. $1^{st}$ subgroup 20, represents images of bordered 3.5"×3.5" (8.89 cm×8.89 cm) prints, $2^{nd}$ subgroup 30, represents images of borderless 3.5"×5" (8.89 cm×12.7 cm) prints with round corners, $3^{rd}$ subgroup 40, represents images of bordered 3.5"×5" (8.89 cm×12.7 cm) prints, and $4^{th}$ subgroup 50, represents images of borderless 4"×6" (10.16 cm×15.24 cm) prints. Even with this new organizational structure, any customer provided grouping or sequence of images is maintained as a sort criterion. Each group, whether envelope, pile or box, should be scanned and tagged as a member of "as received" group and sequence within the group should be recorded.

Figure 2:
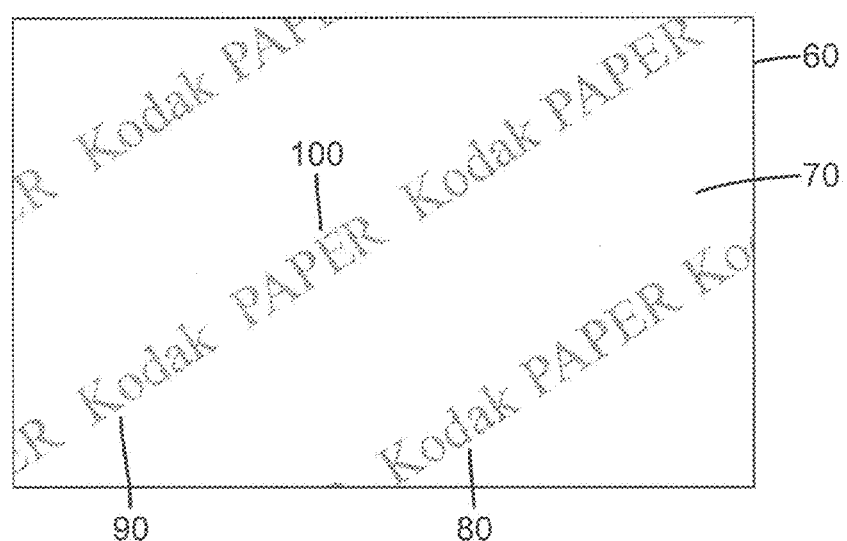
FIG. 2 is an illustration of the non-image surface of a hardcopy media image depicting the manufacturer's media watermark.

FIG. 2 is an illustration of the non-image surface 70, back side of a hardcopy media 60 having an image on the front side (not shown). In the embodiment illustrated, the non-image surface 70 having manufacturer's media watermarks 80, 85 and 90 thereon. These watermarks represent a watermark style that would be recognized by the system by comparison to a "watermark LUT." If a date or other information were available for an image with this watermark, it could be applied as an image tag and sort criterion. FIG. 2 illustrates an example of a common configuration for watermark presentation which in the embodiment illustrated comprises lines of evenly spaced text and/or graphics that run diagonally across the back surface of hardcopy imaging media. In the embodiment illustrated, each of the watermarks 80, 85 and 90 comprise the repeating text "Kodak Paper". Watermark 90 includes a watermark encoding mark 100 which, in the embodiment illustrated, appears as a short line over the "E" in the text "PAPER". This encoding mark 100 typically represents a particular type media which can be often associated with a date of manufacture, or a particular position on the master roll from which the print paper was obtained.

Figure 3A:
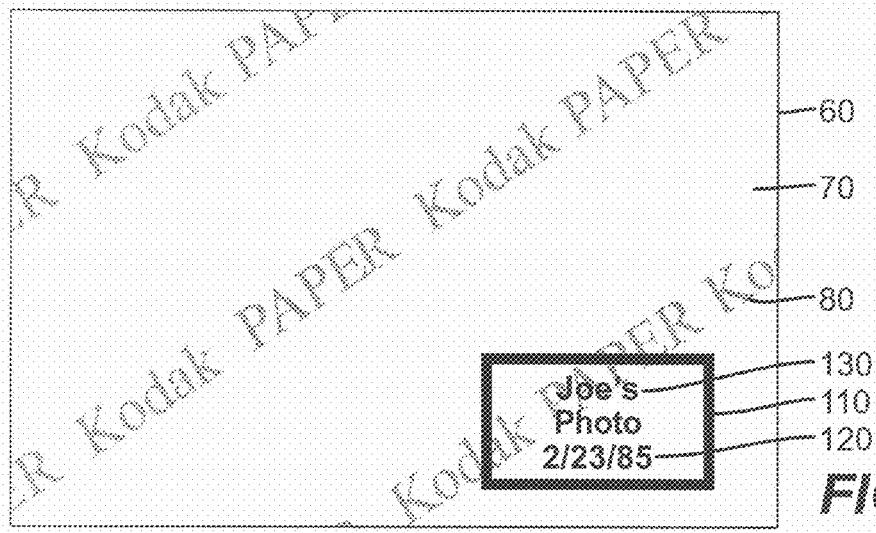
FIG. 3a is an illustration of the non-image surface of a hardcopy media image including an ink printed photofinishing process applied stamp including the date of image processing.
Figure 3B:
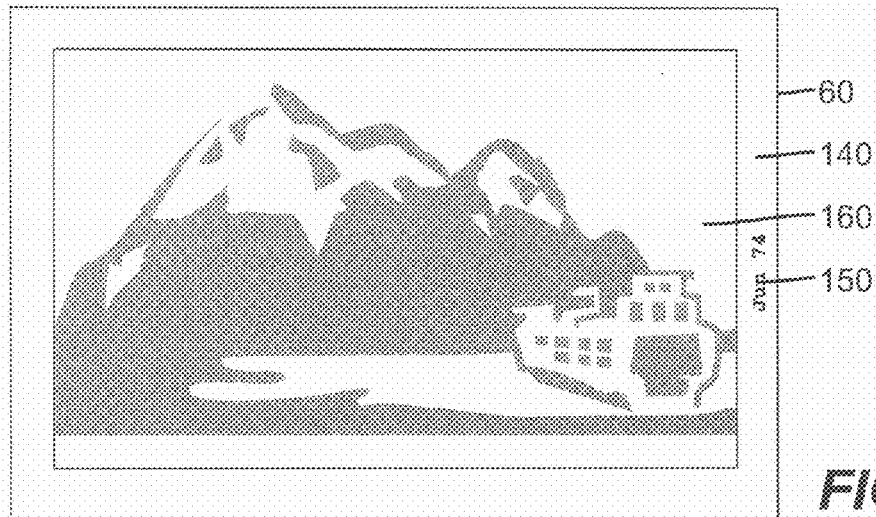
FIG. 3b is an illustration of the image surface of a hardcopy media image including a photographically exposed photofinishing process applied graphic including the date of image processing.
Figure 3C:
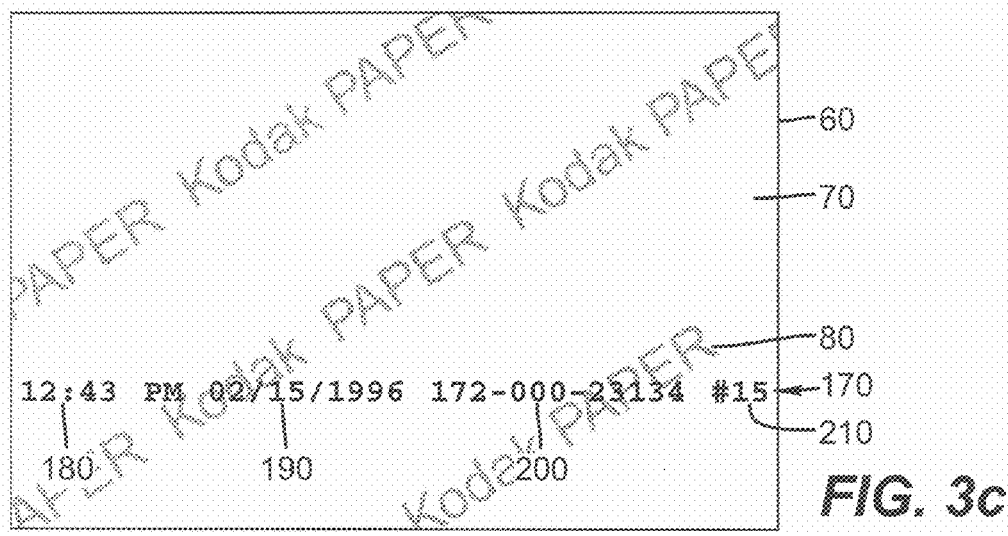
FIG. 3c is an illustration of the non-image surface of a hardcopy media image including a digitally printed photofinishing process applied indicia including a camera recorded time and date of image capture, film roll ID number, and film roll frame number.

FIGS. 3a, 3b, and 3c illustrate various photofinisher applied markings used by photofinishers to provide additional information to the hardcopy media/print 60. FIG. 3a is an illustration of the non-image surface 70 of a hardcopy media 60 that includes an ink printed photofinishing process applied stamp 110. In the embodiment illustrated the stamp 110 includes the original "date of processing" indication 120 and additional information 130 such as a logo, graphic, code number, and the like, either or both being presented in eye or machine readable form. Also recorded on non-image surface 70 is manufacturers watermark 90. If during scanning of the watermark 80 it is determined that watermark 90 is not listed in the LUT library, the newly developed watermark 90 would be added to the LUT as a new watermark style. If the watermark 90 was recognized and matched to a known watermark style, but the LUT lacked a watermark date reference, the original "date of processing" indication 120 is recognized and translated by OCR software and assigned to the associated watermark style as a new date reference.

FIG. 3b is an illustration of the image surface/side 160 of hardcopy media 60. The image side 160, in addition to the image 162, includes a photographically exposed photofinishing process applied graphic 150. In the embodiment illustrated, graphic 150 comprises the "date of processing" and border 140. Image processing software is used to analyze the scanned media and recognizes and records the format and presence of a border and checks the LUT for similar border matches to determine group sort criterion.

FIG. 3c is an illustration of the non-image surface 70 of a hardcopy media 60 that includes a (not necessarily digital) printed photofinishing process applied indicia 170. In the embodiment illustrated, the indicia 170 comprises a camera recorded time 180 and date of image capture 190, film roll ID number 200, and film roll frame number 210. Information recorded by indicia 170 is indicative of the Advanced Photo System which would be noted as an additional criterion. All the related information of the types presented would be captured and translated for matching, grouping, sorting, and sequencing the corresponding image surface records.

Figure 4A:
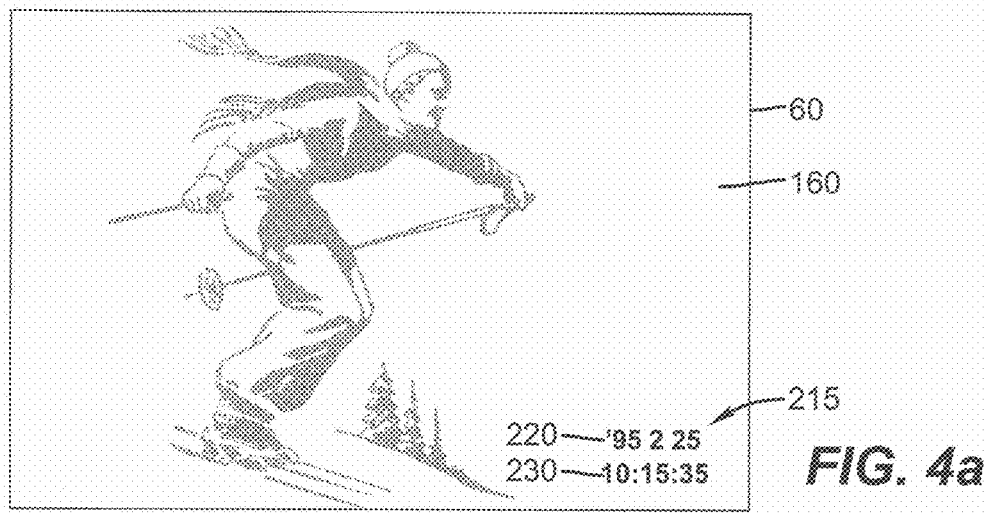
FIG. 4a is an illustration of the image surface of a hardcopy media image including a camera exposed indicia recorded by the film media depicting the time and date of image capture.
Figure 4B:
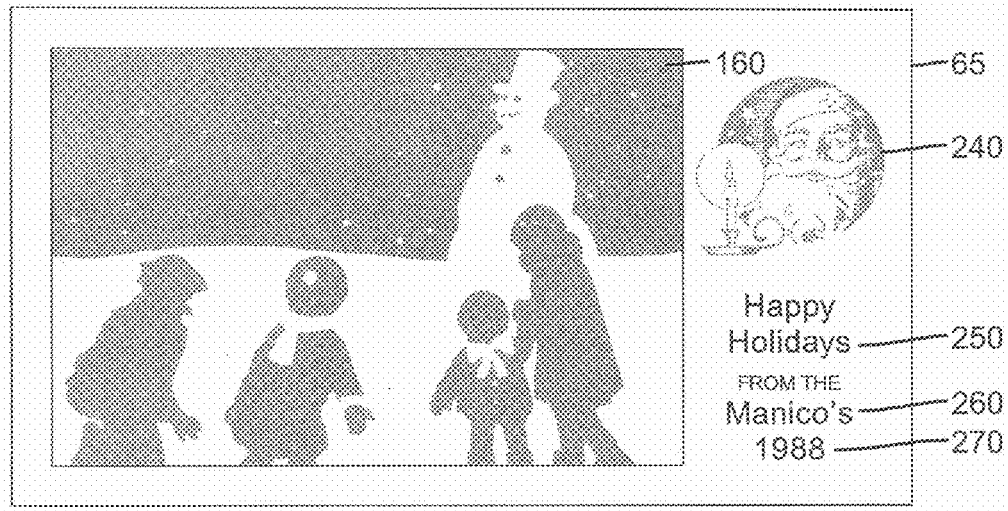
FIG. 4b is an illustration of the image surface of a photographic greeting card including a photofinisher applied decorative graphic including a user selected text and date.
Figure 4C:
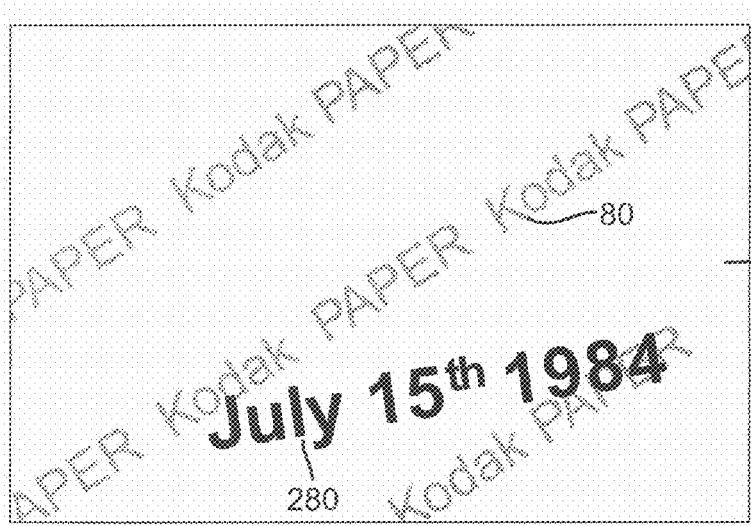
FIG. 4c is an illustration of the non-image surface of a hardcopy media image including a manufacturer's watermark and a user applied handwritten indicia including a date.

FIGS. 4a, 4b, and 4c illustrate additional methods used by photofinishers and photographers to provide additional information to hardcopy images. FIG. 4a is an illustration of the image surface 160 of a recognized hardcopy media 60 including a camera exposed indicia recorded by the film media 215 depicting the time 220 and date 230 of image capture.

FIG. 4b is an illustration of the image surface 160 with a recognized format of a photographic "Greeting Card" including a photofinisher applied decorative graphic, a user selected event designation 250, personal message 260, and date 270. Being recognized, as a "Greeting Card" will provide additional opportunity for event segmentation as well as the event designation 250 of "Holiday" which can be translated, recorded, and used as a criterion tag or indication or filename.

FIG. 4c is an illustration of the non-image surface 70 of a hardcopy media 60 having a manufacturer's watermark 80 and a user applied handwritten indicia 280 that includes a date. It is a common practice for users to annotate the surface of photographs with pens, markers, pencils and the like to record significant information regarding events, date, persons, locations relative the to images recorded on the media. Handwriting analysis and OCR software would be used to translate the text to usable data format. In the case of FIG. 4c, the recorded date would be used to check or update date designations for images with matching watermark pattern 80. As with the previous samples and conditions, the information of the types presented would be captured and translated for matching, grouping, sorting, and sequencing the corresponding image surface records. In addition, the image of the handwritten text and/or its analyzed equivalent is stored in correspondence to the image. Furthermore, the text analyzed may be used to create filenames for the images corresponding to the grouping in which the text is detected.

Figure 5A:
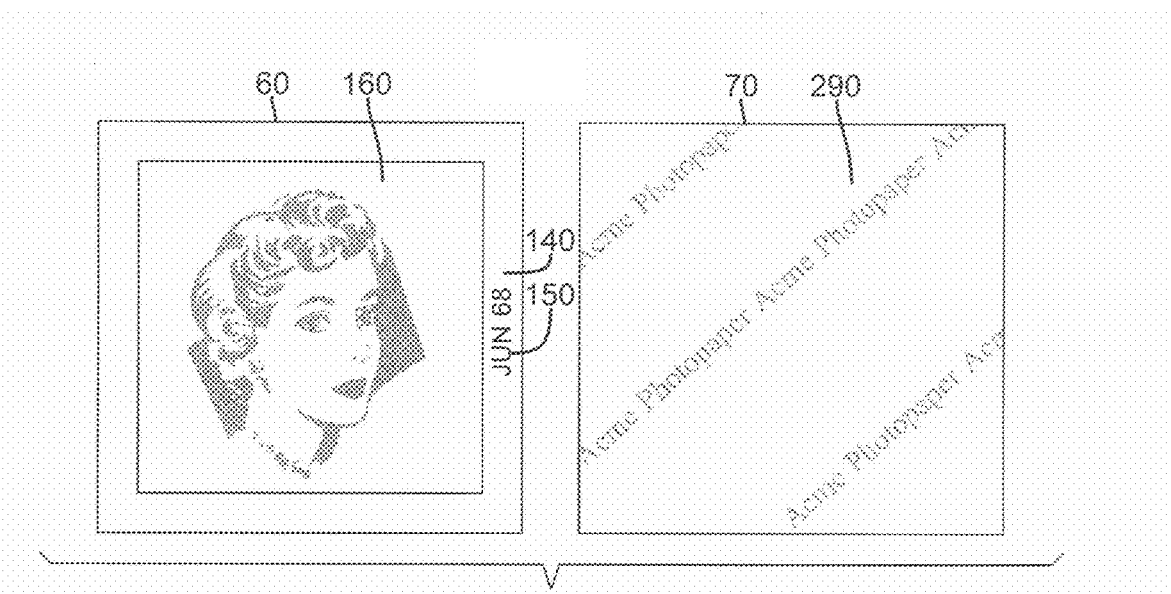
FIG. 5a An illustration of the image and non-image surfaces of a hardcopy media image including a photographically exposed photofinishing process applied graphic including the date of image processing and an unidentified manufacturer's watermark.
Figure 5B:
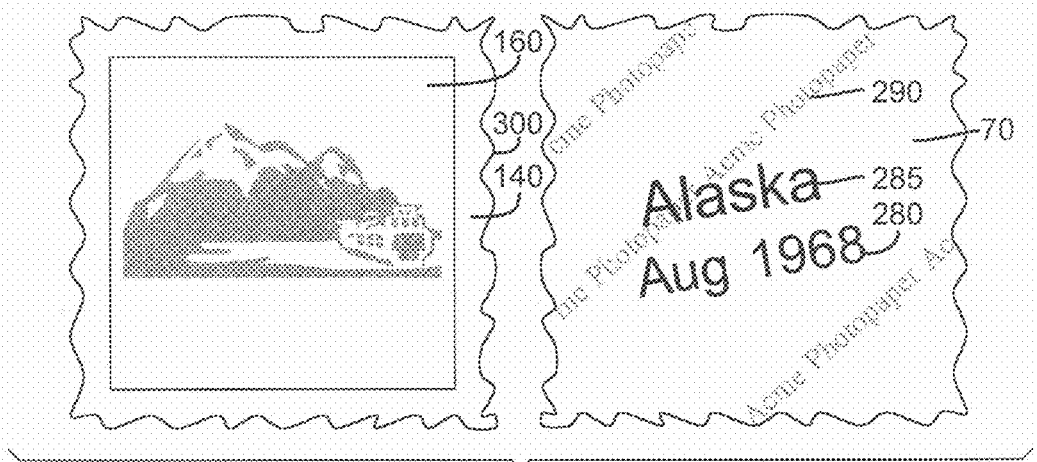
FIG. 5b is an illustration of the image and non-image surfaces of a hardcopy media image including a user applied handwritten indicia including a date, an unidentified manufacturer's watermark, and a unique media shape characteristic.
Figure 5C:
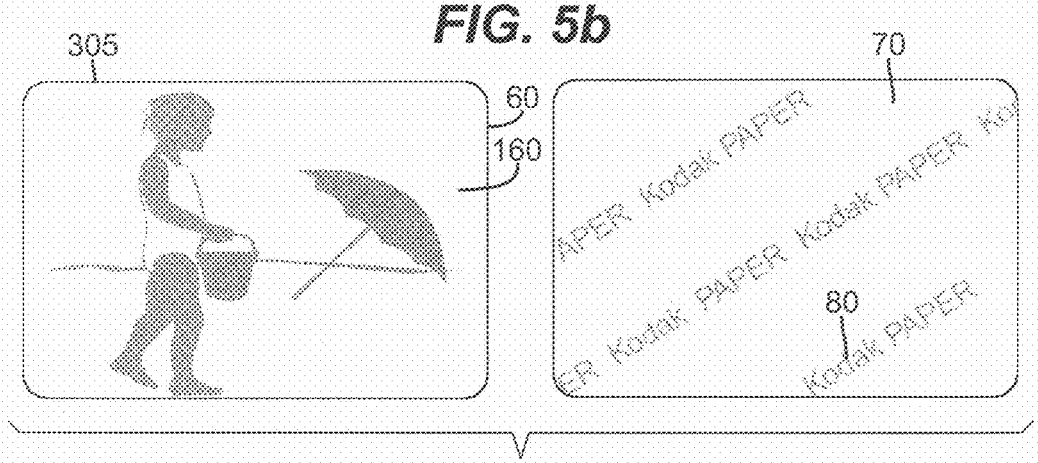
FIG. 5c is an illustration of the image and non-image surfaces of a hardcopy media image including identified manufacturer's watermark and an identified media shape characteristic.

FIGS. 5a, 5b, and 5c illustrate additional characteristics of the media 60 that can be used to provide additional information about the corresponding images on hardcopy media. FIG. 5a is an illustration of the image surface 160 and non-image surface 70 of three different hardcopy media/prints 60 that includes photographically exposed photofinishing process applied graphic 150 that comprises the date of image processing placed in an image border 140. Unidentified manufacturer's watermark 290 is recorded on non-image surface 70 and is correlated to the date acquired from photofinisher-applied graphic 150. The presence and format of border 140 is also noted. This now allows for the potential dating of other media having the same watermarking 290 but not having the date printed on the media 60.

FIG. 5b is an illustration of hardcopy media 300 having a unique media shape characteristic. The image surface 160 includes border area 140 that defines an image area 302 that is identical to image area 302 defined by border area depicted in FIG. 5a. Non-image surface 70 includes unidentified manufacturer's watermark 290 which matches the watermark depicted in FIG. 5a. The user applied handwritten date indicia 280 is used to verify the date indicia provided in the sample depicted in FIG. 5a if the physical characteristics and watermarks match (not shown). This raises the likelihood that the system can use the watermark 290 to date additional media having the same watermark 290 since two independent date sources were used to correlate two samples with a common unrecognized watermark pattern 290.

FIG. 5c is an illustration of the image surface 160 and non-image surface 70 of a hardcopy media 60 with an identified media shape characteristic 305, in this case ½" (1.27 cm) radius rounded corners, and recognized manufacturer's watermark 80. The shape characteristic 305 would also be captured and translated for matching, grouping, sorting, and sequencing the corresponding image surface records.

Figure 6A:
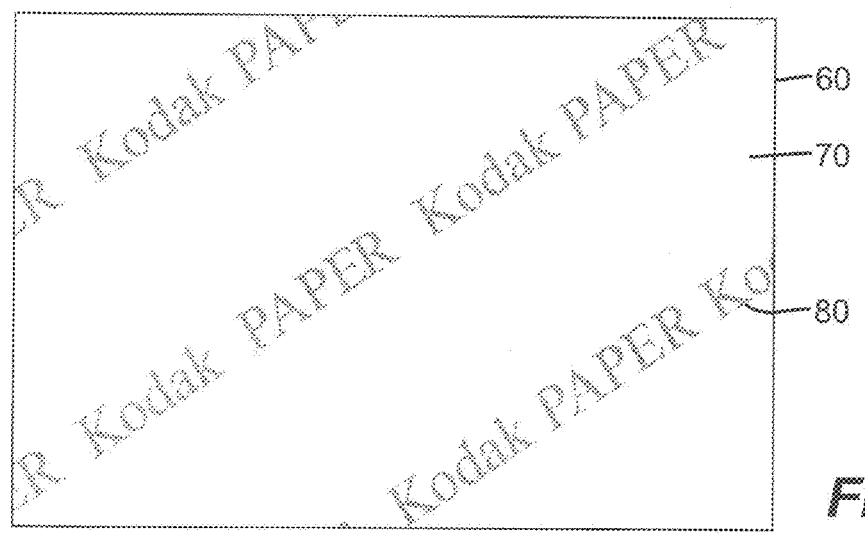
FIG. 6a is an illustration of the non-image surface of a hardcopy media image including an identified manufacturer's watermark with the known time period of manufacture "A".
Figure 6B:
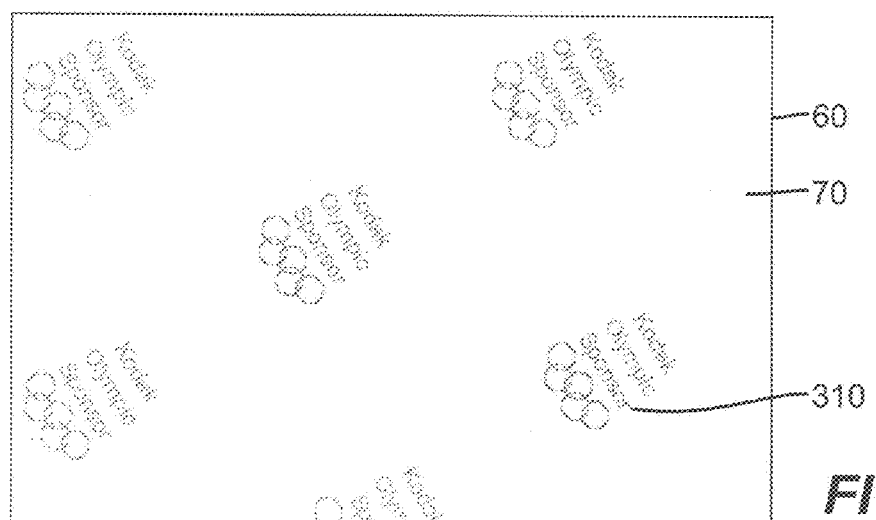
FIG. 6b is an illustration of the non-image surface of a hardcopy media image including an identified manufacturer's watermark with the known time period of manufacture "B".
Figure 6C:
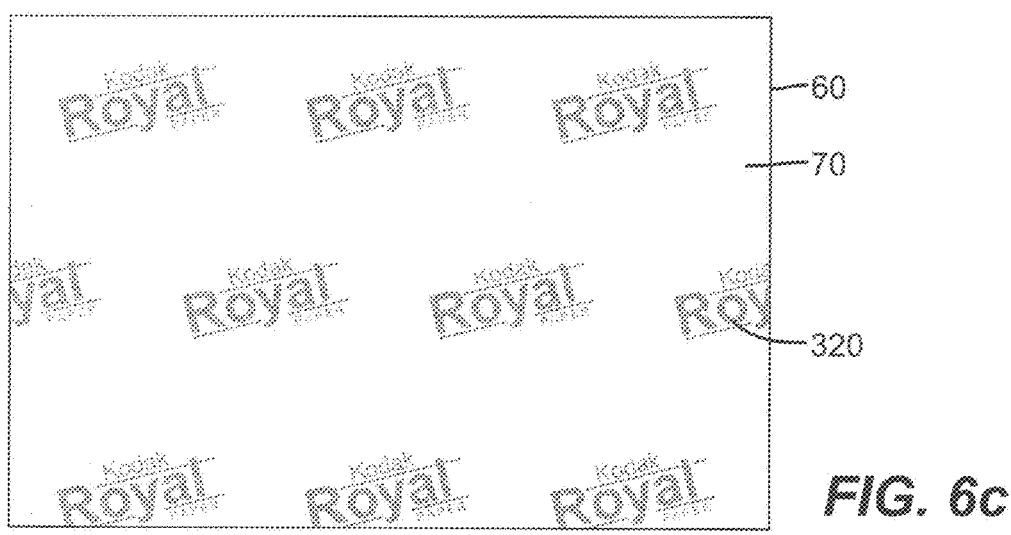
FIG. 6c is an illustration of the non-image surface of a hardcopy media image including an identified manufacturer's watermark with the known time period of manufacture "C".

FIGS. 6a, 6b, and 6c illustrate various different types of watermark styles used by manufacturers that are made available to the market over time. FIG. 6a is an illustration of the non-image surface 70 of a hardcopy media 60 including an identified manufacturer's watermark 80 having a known associated time period of manufacture "A". FIG. 6b is an illustration of the non-image surface 70 of a hardcopy media 60 having an identified manufacturer's watermark 310 that is known to be associated with time period of manufacture "B", in this case the date corresponding to time period close to a particular event such as the Olympics. Watermark 310 was designed to commemorate a manufacturer's sports sponsorship and includes text and graphic. The date of manufacturing and duration, and volume of availability of image media bearing this watermark are known to the manufacturer and this information is provided in the form of a LUT. FIG. 6c is an illustration of the non-image surface 70 of a hardcopy media 60 having an identified manufacturer's watermark 320 with the known time period of manufacture "C". Watermark 320 was designed by the manufacturer to illustrate the high quality, superior gloss and heavier stock of the media bearing this watermark. These factors as well as the manufacturing and sales history are also made available as a LUT. The non-image surfaces 70 and hardcopy media format 60 are identical for samples depicted in FIGS. 6a, 6b, and 6c, however each has a different watermark style that are recognized and identified to patterns available in the LUT.

Since the manufacturing date histories of the various watermark styles are known to the manufacturer, images corresponding to these watermarks can be identified with these dates even if no other date information is available for these groups of images. Also any additional media characteristics such as surface treatment, color gamut capability, media stock thickness known to the manufacturer and associated with a known watermark style can also be made available as a LUT. The various recognized watermark styles with known manufacturing dates provides a previously unutilized method for providing a date of image origination when no other date information is available and provides another criterion for matching, grouping, sorting, and sequencing the corresponding image surface records.

There are also image analysis techniques that can be employed to determine grouping and/or dating. These can be used to augment the grouping provided by physical characteristics and watermarks and other previously described methods. These image analysis techniques include:

Image Event Clustering:

Event and sub-events could be determined automatically using algorithms that analyze captured date and time, as well as the color histogram of images. Event boundaries could be determined by applying a 2-means clustering algorithm to the time difference histogram associated with the input images. For each event detected, sub-event boundaries could be determined using a block histogram correlation method. These methods have been disclosed in prior art U.S. Pat. Nos. 6,351,556 and 6,606,411. Other methods of detecting event and sub-event clusters could also be used in place of the above techniques.

Face Detection and Clustering:

By utilizing a (frontal) face detection algorithm combined with age/gender classification techniques, similar faces can be clustered and grouped for user to label.

Grouping images by people involves a number of intermediate steps. First, faces are detected in the input images. Then, age and gender classification is performed which use the approximate eye locations from the face detection step. Face similarity computation is performed based on the cropped faces detected, and the similarity score and age/gender labels are provided to the clustering module. Clusters are generated of faces with high similarity scores and matching labels.

Content-based Image Similarity:

Content-based image similarity is a technique that allows the search and retrieval of images that have similar content with a reference image. Our technique utilizes a combination of features which includes coherent color, color composition, and texture.

Coherent color identifies perceptually significant colors within an image and records it in the form of a coherent color histogram. Color composition identifies perceptually significant spatial relationship of dominant coherent colors.

Indoor/Outdoor Detection:

Image analysis algorithms have been developed to detect whether the scene of a picture is an outdoor scene or an indoor scene. This is accomplished by computing the probabilistic region map of an image followed by a statistical classifier. Scene with the presence of sky and glass is a strong indication of outdoor scene. Hence algorithm that can detect sky/glass can also be utilized here. In addition, the use of image metadata from capture, e.g., flash on/off, will increase the accuracy of the algorithm. Such indoor/outdoor information can also be used to organize images according to location.

Figure 7A:
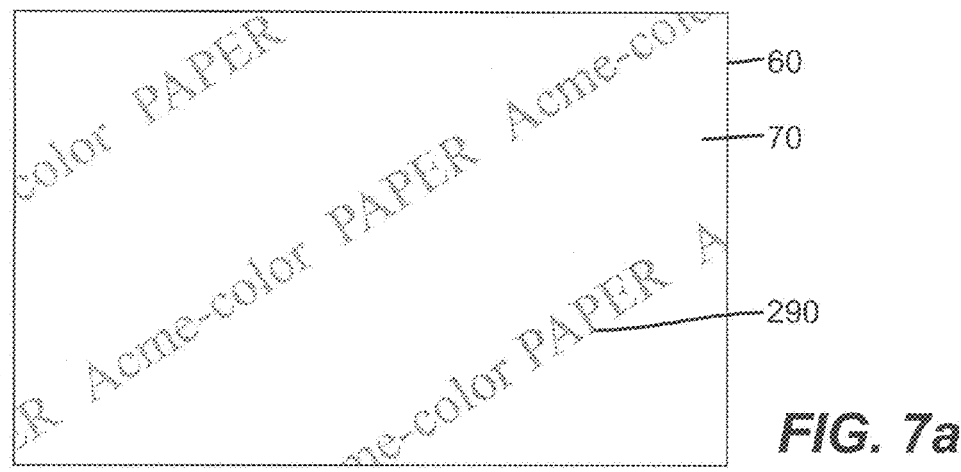
FIG. 7a is an illustration of the non-image surface of a hardcopy media image including an unidentified alphanumeric manufacturer's watermark with an unknown time period of manufacture.
Figure 7B:
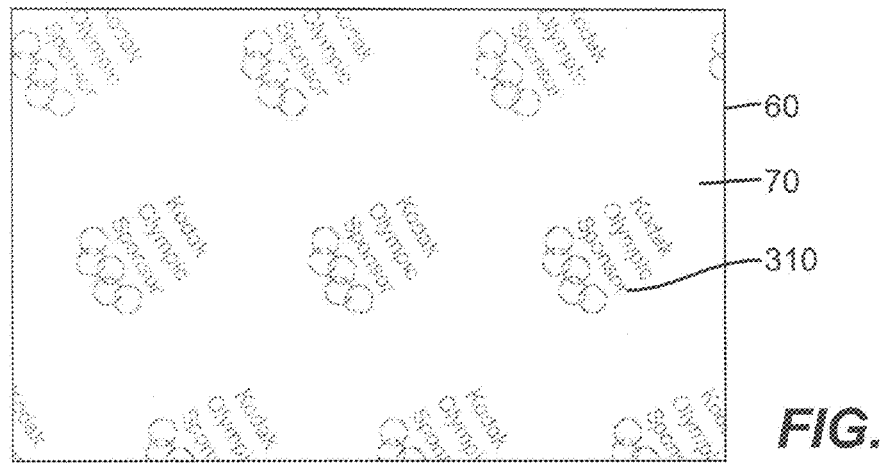
FIG. 7b is an illustration of the non-image surface of a hardcopy media image including an identified alphanumeric and graphic manufacturer's watermark with a known time period of manufacture.
Figure 7C:
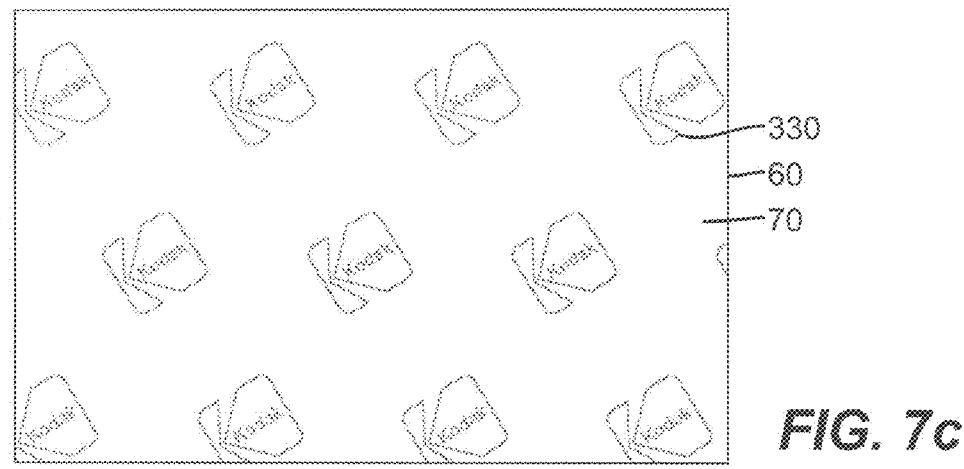
FIG. 7c is an illustration of the non-image surface of a hardcopy media image including an identified graphic manufacturer's watermark with a known time period of manufacture.

FIGS. 7a, 7b, and 7c illustrate various types of unrecognized and recognized watermark styles used by manufacturers that have been made available to the market over time. FIG. 7a is an illustration of the non-image surface 70 of a hardcopy media 60 including an unidentified alphanumeric manufacturer's watermark 290 with an unknown time period of manufacture and availability. FIG. 7b is an illustration of the non-image surface 70 of a hardcopy media 60 including an identified alphanumeric and graphic manufacturer's watermark 310 with a known time period of manufacture.

FIG. 7c is an illustration of the non-image surface 70 of a hardcopy media including an identified graphic manufacturer's watermark 330 with a known time period of manufacture and availability. The embodiments depicted in FIGS. 7a, 7b, and 7c demonstrate that if an unrecognized watermark 290 is recorded, the images corresponding to this watermark style will be identified as different from other watermarks even though the other physical characteristic of the media are the same. Since the time frames of watermarks 310 and 330 are known and the physical characteristics of all the samples are matched, the sample depicted in FIG. 7a can be assumed to fall within the time frame of images with matching physical characteristics while maintaining an independent group identification established by the unrecognized watermark. This demonstrates that images corresponding to an unknown watermark can be provided with a group context and chronological reference.

Figure 8A:
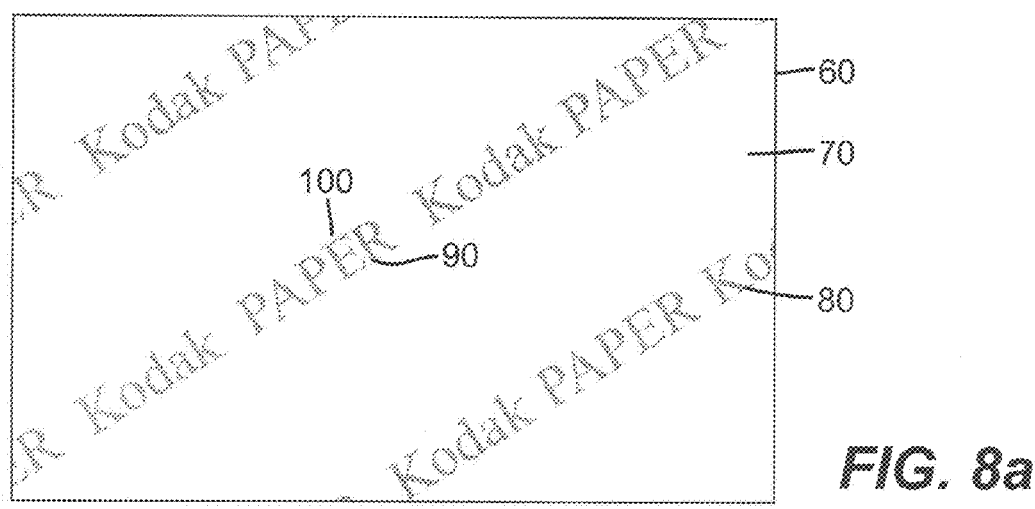
FIG. 8a is an illustration of the non-image surface of a hardcopy media image including an identified graphic manufacturer's watermark with a known time period of manufacture and watermark variant type "A".
Figure 8B:
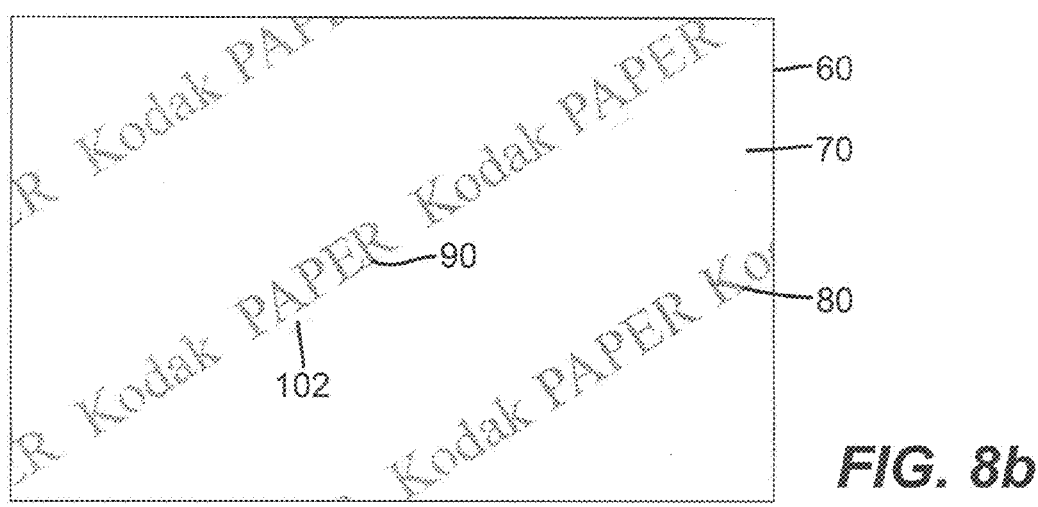
FIG. 8b is an illustration of the non-image surface of a hardcopy media image including an identified graphic manufacturer's watermark with a known time period of manufacture and watermark variant type "B".
Figure 8C:
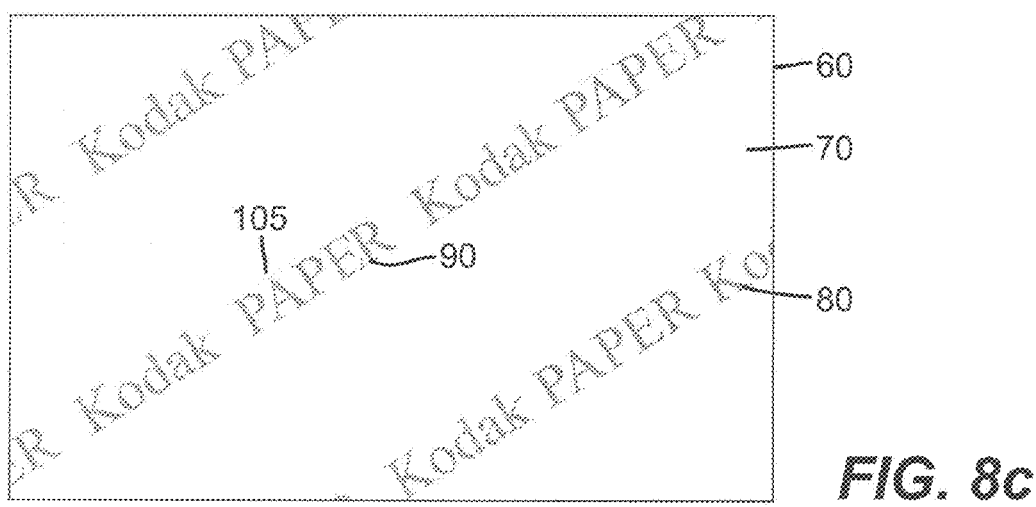
FIG. 8c is an illustration of the non-image surface of a hardcopy media image including an identified graphic manufacturer's watermark with a known time period of manufacture and watermark variant type "C".

FIGS. 8a, 8b, and 8c illustrate various types of recognized watermark styles including manufacturing code variants used by manufacturer for inventory and process control. FIG. 8a is an illustration of the non-image surface 70 of a hardcopy media 60 including an identified graphic manufacturer's watermarks 80, 85 and 90 with a known time period of manufacture and watermark variant 90 "Kodak Paper" with coded mark 100 designated type "A". Mark 100 in this embodiment comprises "$\overline{E}$". FIG. 8b is an illustration of the non-image surface 70 of a hardcopy media image 60 including an identified graphic manufacturer's watermark with a known time period of manufacture and watermark 90 having a coded mark 102 designated type "B". Mark 102 in this embodiment comprises "$\underline{A}$". FIG. 8c is an illustration of the non-image surface 70 of a hardcopy media image 60 including an identified graphic manufacturer's watermarks 80, 85, and 90 with a known time period of manufacture and watermark 90 with coded mark 105 designated type "C". Mark 105 in this embodiment comprises "$\overline{A}$". A large number of hardcopy images, spanning many events and rolls of film may all have the same general overall watermark style as illustrated by watermarks 80, 85, and 90, with the addition of using the identified watermark coded variant as a new criterion demonstrated by the coded marks of 100, 102, and 105, the image group can be further organized and refined for an improved method of matching, grouping, sorting, and sequencing the corresponding image surface records. Note that this technique can also be applied to unrecognized watermarks with coded variants.

Figure 9:
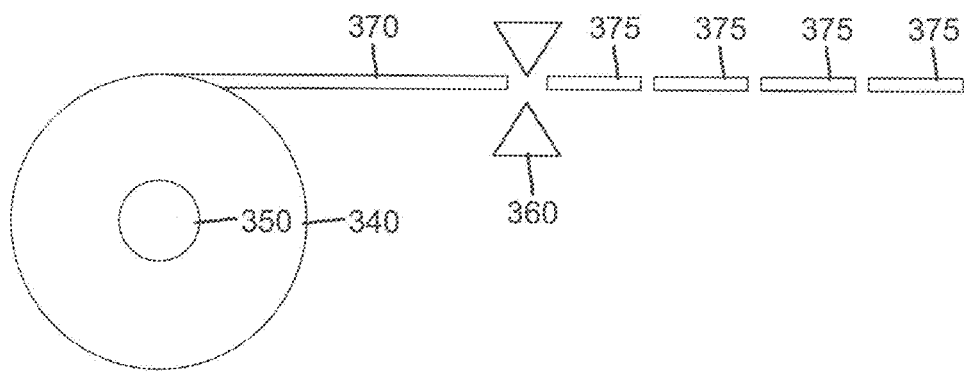
FIG. 9 is a graphic illustration of the process of converting roll photographic paper into individual cut prints.

Referring to FIG. 9 a graphic illustration of the process of converting roll photographic paper into individual cut prints with hardcopy media roll 340 wrapped around mounting core 350. Length of hardcopy media 370 is unwound from roll 340 and transported to media cutter 360 forming individual hardcopy prints 375 of uniform size and shape.

Figure 10A:
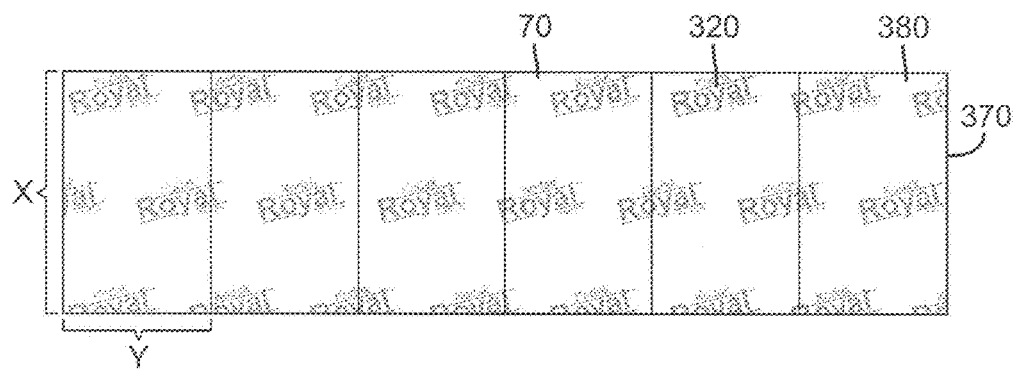
FIG. 10a is an illustration of the non-image surface of a length of hardcopy media including an identified graphic manufacturer's watermark, where the media is "X" wide and with cut positions "Y" long.

FIG. 10a is an illustration of the non-image surface 70 of a length of hardcopy media 370 including an identified graphic manufacturer's watermark 320, where the media width is "X" having cut lengths "Y" long forming recognized format short advance cut print 380.

Figure 10B:
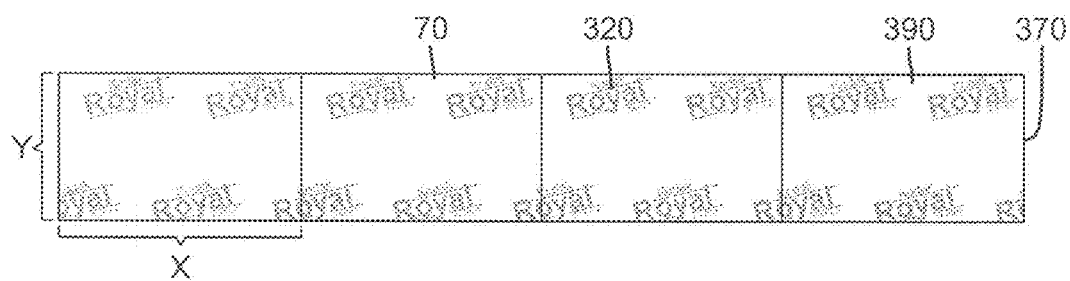
FIG. 10b is an illustration of the non-image surface of a length of hardcopy media including an identified graphic manufacturer's watermark, where the media is "Y" wide and with cut positions "X" long.

FIG. 10b is an illustration of the non-image surface 70 of a length of hardcopy media 370 including an identified graphic manufacturer's watermark 320, where the media width is "Y" having cut lengths "X" long forming recognized format long advance length cut print 390. Although cut prints 380 and 390 are identical in size and shape and have the same watermark, the prints can be recognized as different because the watermark orientations are different. This is illustrative of how watermark orientation can be used to determine the original roll width and cut pattern of the hardcopy imaging media.

This method also illustrates how watermark orientation can also be used as a baseline reference to determine corresponding image orientation by knowing the configuration and orientation of the imaging media during the printing process. This may be applied to a grouping of images so that orientation of the images for that grouping, assumed to be from a single camera, is more easily determined on the basis of multiple images as opposed to a single image.

Figure 11A:
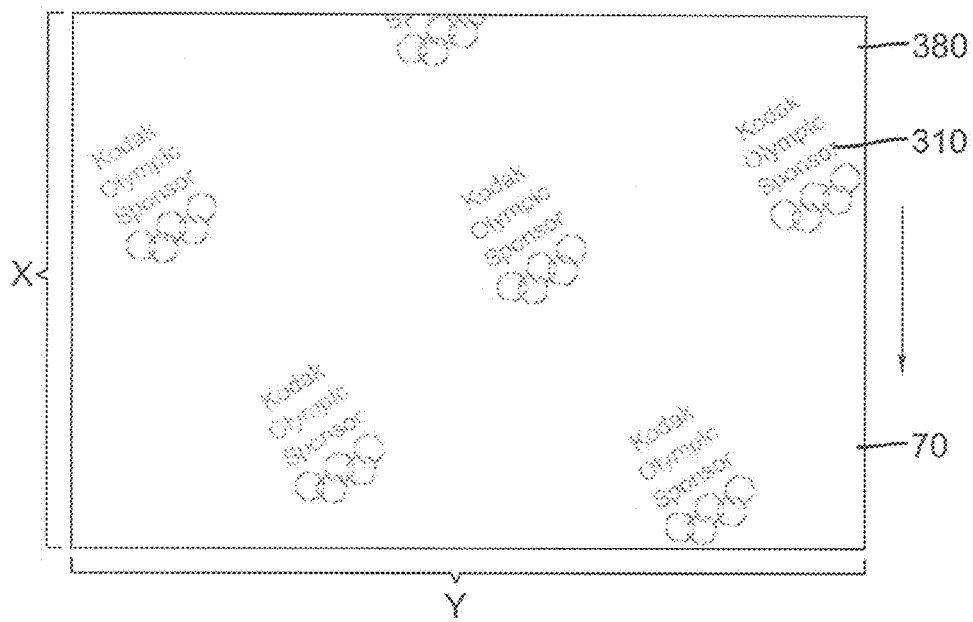
FIG. 11a is an illustration of the non-image surface of an individual hardcopy media print including an identified graphic manufacturer's watermark, where the media is "X" wide and with cut positions "Y" long.
Figure 11B:
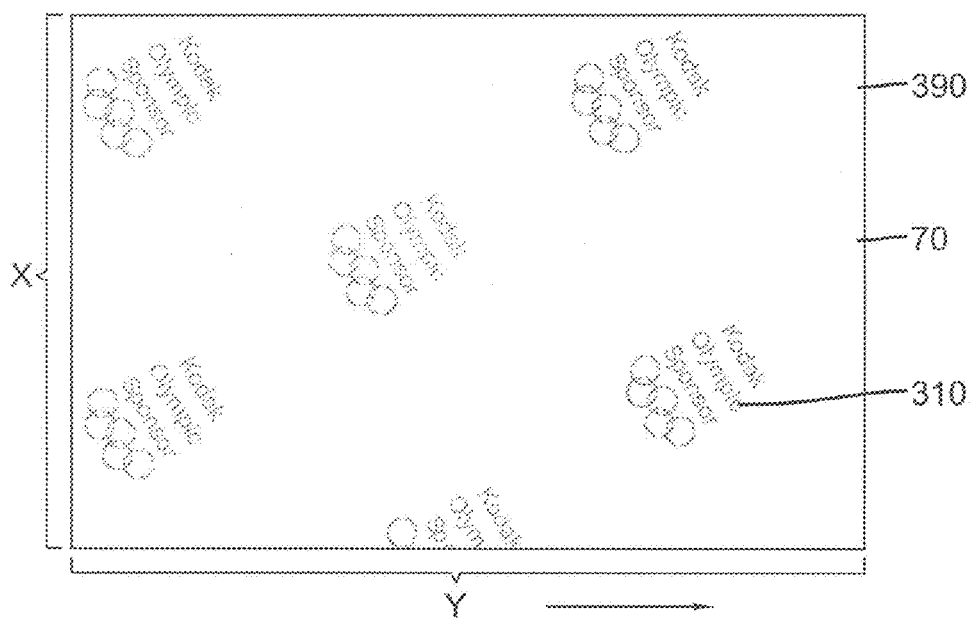
FIG. 11b is an illustration of the non-image surface of an individual hardcopy media print including an identified graphic manufacturer's watermark, where the media is "Y" wide and with cut positions "X" long.

FIGS. 11a and 11b are further examples illustrating the relationship between format and watermark orientation. FIG. 11a is an illustration of the non-image surface 70 of an individual hardcopy media print 380 including an identified graphic manufacturer's watermarks 310, where the media width is "X" with cut lengths "Y". FIG. 11b is an illustration of the non-image surface 70 of an individual hardcopy media print 390 including an identified graphic manufacturer's watermark 310, where the media width is "Y" and with cut lengths "X". The arrows 382, 392 adjacent to the figures indicate the original transport direction of the media through the photofinishing equipment. It is apparent that the watermark orientations between prints 380 and 390 is offset by 90° and since the original roll pattern of the watermark is known the original configuration of the media can be automatically determined.

Figure 12A:
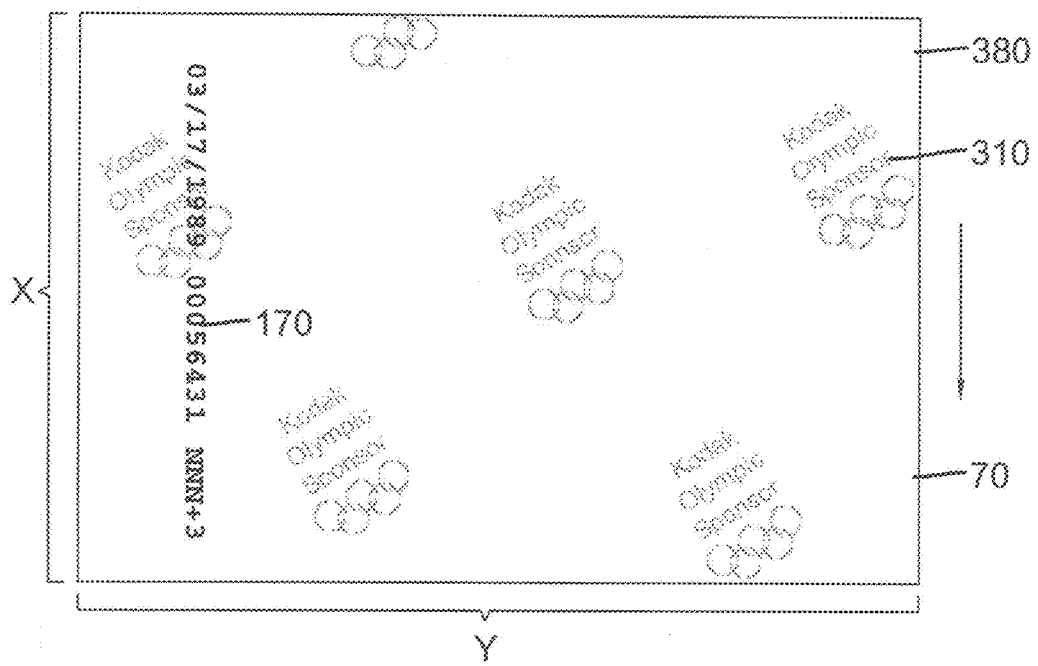
FIG. 12a is an illustration of the non-image surface of an individual hardcopy media print including an identified graphic manufacturer's watermark, where the media is "X" wide and with cut positions "Y" long, including digitally printed alphanumeric characters applied by the photofinisher.
Figure 12B:
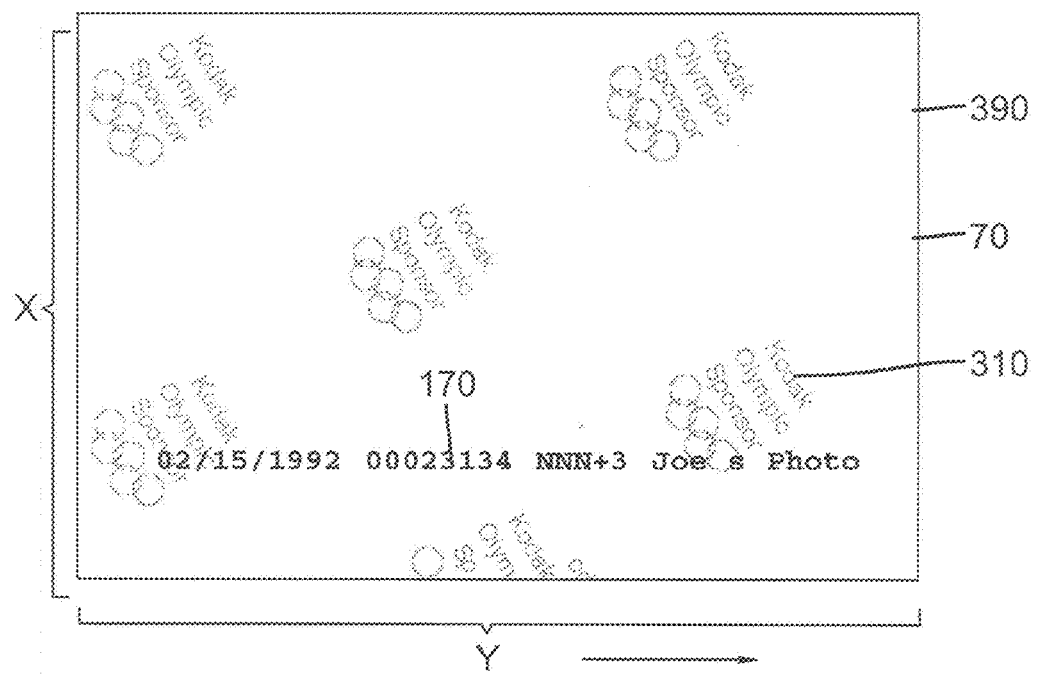
FIG. 12b is an illustration of the non-image surface of an individual hardcopy media print including an identified graphic manufacturer's watermark, where the media is "Y" wide and with cut positions "X" long, including digitally printed alphanumeric characters applied by the photofinisher.

FIGS. 12a and 12b are still further examples illustrating the relationship between format, watermark orientation, and photofinisher applied indicia orientation. FIG. 12a is an illustration of the non-image surface 70 of an individual hardcopy print 380 having a plurality of identified graphic manufacturer's watermarks 310, where the media width is "X" and with cut length "Y", wherein digitally printed alphanumeric characters 170 applied by the photofinisher are in a vertical orientation relative to the print. Since this photofinisher applied indicia 170 is printed with a linear array type printer that prints in the direction of the media transport, the original orientation of the media during the printing process is readily determined. FIG. 12b is an illustration of the non-image surface 70 of an individual hardcopy media print 390 including an identified graphic manufacturer's watermark 310, where the media width is "Y" and the cut length is "X", wherein the digitally printed alphanumeric characters are applied by the photofinisher 170. In this case photofinisher applied indicia 170 is in a horizontal orientation. The arrows 384, 394 adjacent to the figures indicate the original transport direction. It is apparent that the watermark orientations between prints 380 and 390 are offset by 90° and since the original roll pattern of the watermark is known, the original configuration of the media can be automatically determined which can be used to establish a known group orientation. In addition, if the samples depicted in FIGS. 12a and 12b did not have watermarks, the photofinisher applied indicia 170 alone would provide enough information to determine the original media orientation established during the printing process. Furthermore, if there is no watermark and there is photofinisher applied indicia 170 alone, that information can be used to determine grouping.

Figure 13A:
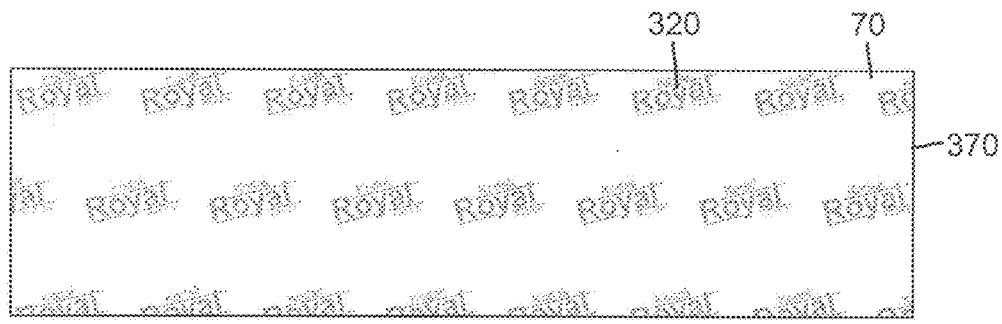
FIG. 13a is an illustration of the non-image surface of a length of hardcopy media including an identified graphic manufacturer's watermark.
Figure 13B:
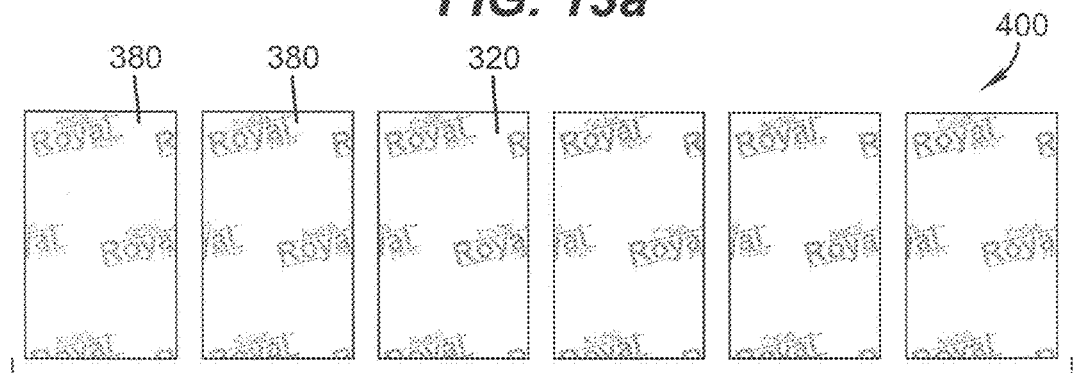
FIG. 13b is an illustration of the non-image surface of a length of hardcopy media including an identified graphic manufacturer's watermark, that has been cut into individual prints.
Figure 13C:
FIG. 13c is an illustration of the non-image surface of a length of hardcopy media including an identified graphic manufacturer's watermark that has been cut into individual prints and arranged in random order.
Figure 13D:
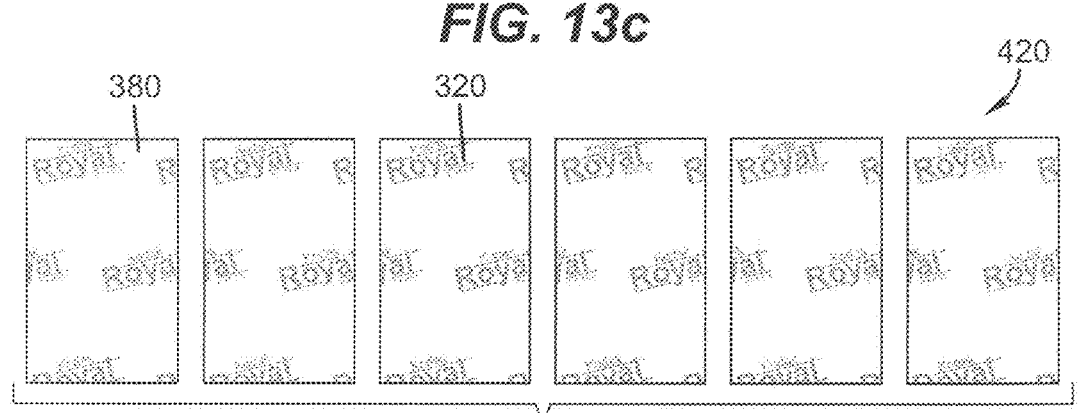
FIG. 13d is an illustration of the non-image surface of a length of hardcopy media including an identified graphic manufacturer's watermark that has been cut into individual prints and arranged in their original sequence by reassembling the pattern of the cut watermarks.

FIGS. 13a, 13b, 13c, and 13d are used to describe a method of how the watermark-derived criterion can be used to determine the original printing sequence of the hardcopy media. FIG. 13a is an illustration of the non-image surface 70 of a length of hardcopy media 370 including an identified graphic manufacturer's watermarks 320. During the printing and finishing process the length of hardcopy media 370 is cut into individual image prints 380 in a sequence they were printed as illustrated by FIG. 13b. The individual image prints 380 depicted in FIG. 13c have become disorganized and out of sequence 400. This condition is usually caused by handling and inadequate storage means and methods. As FIG. 13c illustrates sections of watermarks 320 are visually mismatched. If the image prints 380 were in their original sequence the cut watermark sections and watermark pattern would appear as a properly assembled puzzle. The cut patterns of prints and individual print watermark location have an apparent random relationship due to the cutting frequency and the watermark printing frequency being out of phase. In FIG. 13d the non-image surface of a length of hardcopy 420 have been reassembled into its original configuration by using the cut watermark sections and individual print watermark patterns as assembly guides. The acquired digital images containing watermark 320 are processed with image pattern recognition and matching algorithms process to identify watermark patterns and cut sections. Note that accommodation may be made for strips of waste cut from between adjacent images. Note also that accommodation may be made for missing images. This grouping and sequence criterion is used to organize the corresponding digital image prints and can be used collaboratively with any previously described technique including image derived event and sequence determination. In addition this criterion can also be used for matching, grouping, sorting, and sequencing the corresponding image surface records.

Figures 14, 15:
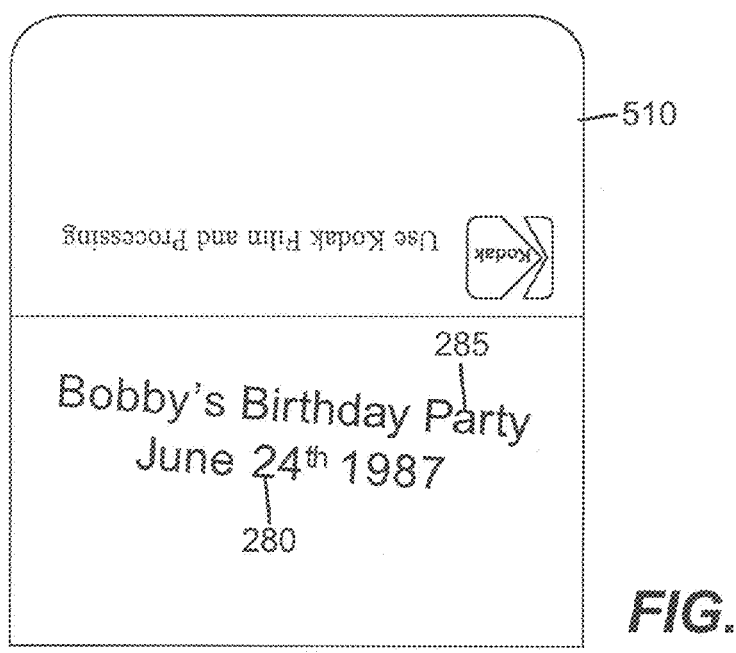
FIG. 14 is an illustration of a photofinishing order envelope with a hand written date, user name, and photo number, also including user selected film type designation and photofinishing options.
FIG. 15 is an illustration of a print return envelope with a hand written date and event designation.

Referring to FIG. 14, a depiction of a photofinishing order envelope 430 with a user applied hand written date 460, user name 450, and phone number 470. The envelope 430 also provides check boxes for the user to designate the services required such as film type designation 490 and print size request 480. Photofinishing order envelope 430 also includes photofinishing lab/retailer designation 440 and Photofinishing order bag sequence number 500. Packaging material like photofinishing order is usually returned to the user with the finished prints. If the user retains photofinishing order envelope 430, it can be scanned and digitized and the information obtained for the photo processing envelope can be used at an additional sort criterion applied to hardcopy media images that may be contained within.

FIG. 15 is an illustration of a print return envelope 510 with a hand written date 280 and event designation 285. If print return envelope 510 is retained by the user, it can be scanned and digitized and the information obtained for the print return envelope can be used at an additional sort criterion applied to hardcopy imaging media that may be contained within. With both examples depicted in FIGS. 15 and 16 the packaging material can be used as separators for the scanner to indicate that the group of images scanned in adjacent sequence to the packaging material was contained within that packaging material. The shape and style of the packaging material may also be used as a sorting criterion. Note that scans of envelopes may or may not be stored with images. When stored with images, the envelopes are indicated as such so that display programs will not display them.

Figure 16:
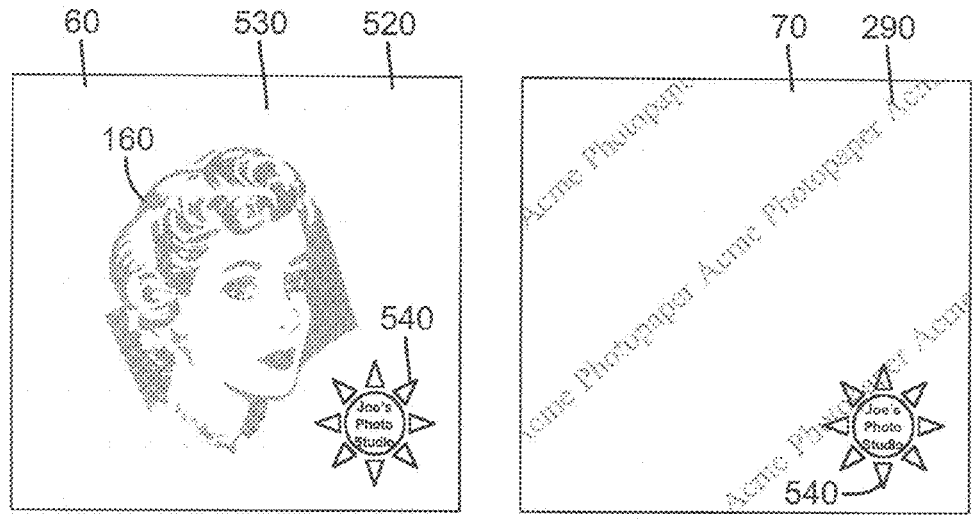
FIG. 16 is an illustration of the image and non-imaging surfaces of a copy restrictive hardcopy media depicting a professionally photographed portrait including the photographer's logo on each surface.

FIG. 16 is an illustration of hardcopy media 60 with image surface 160 and non-imaging surface 70 printed on copy restrictive hardcopy media 520 depicting a professionally photographed portrait including the photographer's logo 540 on each surface. The feature that provides the copy restrictive capability is well known in the art and is depicted by the array of evenly spaced dots 530. These dots are a hue of yellow that is very difficult to see with the human eye but this color and pattern of dots are readily discernable by scanning systems equipped with copy restrictive protection software. The non-image surface 70 includes unrecognized watermark 290 and a notation of the copy restrictive media is associated with this watermark. Since this image record included indication of copy restrictive media and a logo the system will reject making a duplicate copy of this image and remove it from the digital image collection so as to not violate copyright regulations. Alternatively, this pattern of dots and/or the detected logo can be used as a sorting criterion.

Figure 17:
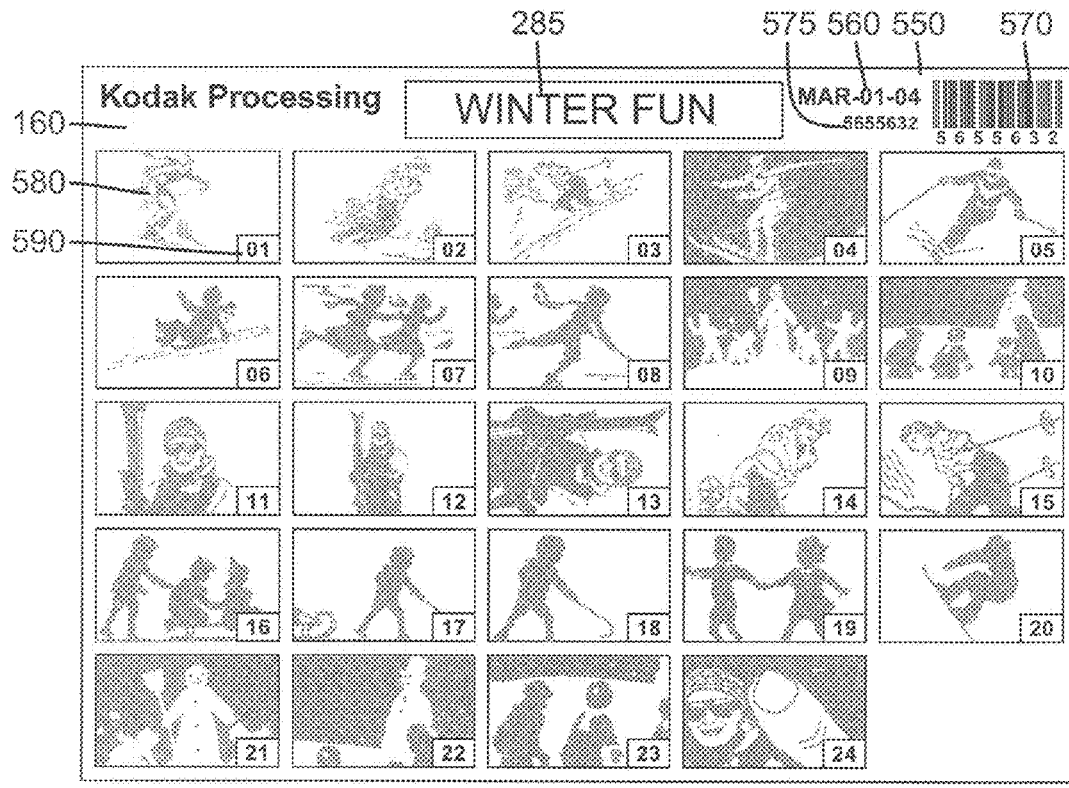
FIG. 17 is an illustration of the image surface of hardcopy media index print with a photofinisher applied, digitally exposed processing date and user applied handwritten event designation.

FIG. 17 is an illustration of the image surface 160 of hardcopy media index print 550 with a photofinisher applied, digitally exposed processing date 560 and user applied handwritten event designation 285. Also included on the index are machine and eye readable order numbers 570 and 575 and a matrix of index images 580 with individual image frame numbers 590. The index print 550 is scanned along with the hardcopy image collection and used to identify images that are associated with that index print by digital image comparison techniques. Scanned frame numbers 590 can be assigned to hardcopy image prints, not shown, that match a corresponding index image. The user applied event designation can be translated and used as an event criterion to designate the group of images that match the images recorded on the index print. In addition, the image of the handwritten text and/or its analyzed equivalent is stored in correspondence to the images. Furthermore, the text analyzed may be used to create filenames for all the images corresponding to the imagettes on the index print. The sequence of the images 580 on the index print 550 can be correlated to the frame number designation 590 and that sequence and expected number of images for that event group can be applied to the hardcopy images that match the images recorded on the index print 550. Scanning the index print and using the information and images contained on it provides an improved method for matching, grouping, sorting, and sequencing the matched hardcopy media image surface records and providing date and event designations.

Figure 18:
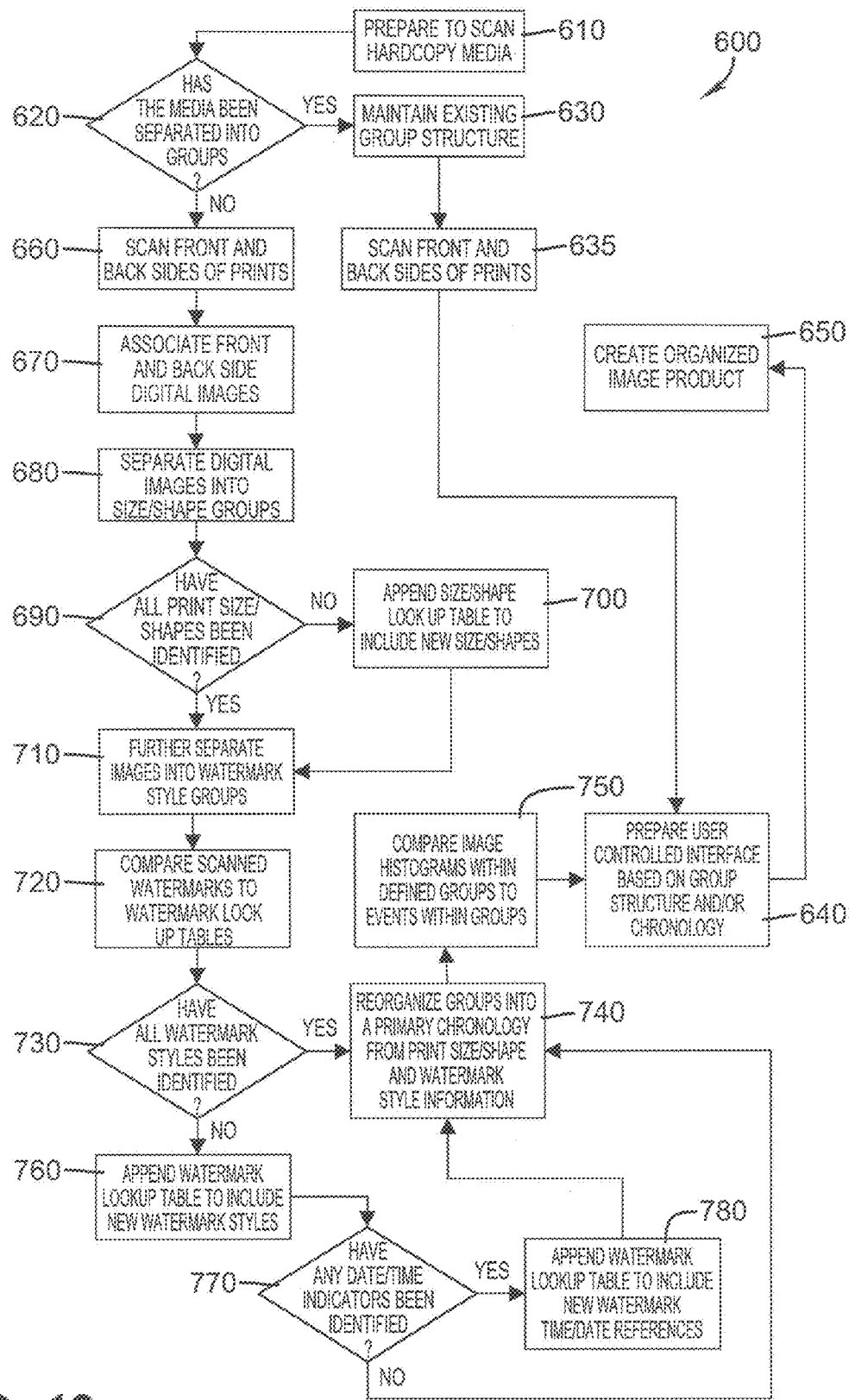
FIG. 18 is a flow chart illustrating the sequence of operation for hardcopy image sorting.

Referring now to FIGS. 18a and 18b a description of the operation of a system according to the present invention will now be described. FIG. 18a is a graphic depiction of a method flowchart 600 illustrating the sequence of operations for hardcopy image scanning and sorting, and FIG. 18b illustrates a system for implementing the various operations. This operational procedure may be performed as a "While you wait" service or may require the user to leave the hardcopy media with an operator for a period of time, for example 24 hours. The hardcopy media may include any or all of the following forms of input modalities such as prints in photofinishing envelopes, prints in shoeboxes, prints in albums, and prints in frames. The hardcopy media may be scanned by scanner 602 in the order which the media was received or the option for physical "print separators" such as card or original packaging materials with user supplied or selected text may also be included with the scanned hardcopy image media. The "prepare to scan" step 610 involves removing the hardcopy imaging media from its packaging material maintaining any sequence that it encountered.

At media grouping decision step 620 it is determined by observations, such as the image prints are stored in separate envelopes, if the system automatic sorting routines will be deployed, if an acceptable organizational structure is encountered or if the user requests that the existing order structure is maintained. Step 630 is selected if the existing group structure is to be maintained. The front and back surfaces of the hardcopy media are scanned at step 635. The organization of the interface in the image product is dependent upon the group structure determined. This group structure is incorporated in the user interface for the organized image product at step 640. A user selected organized image product is created at step 650.

If at media grouping decision step 620 it is determined that there is no existing customer grouping that is to be maintained, the hardcopy images will then be scanned by scanner 602 and automatically organized by computer 604. First the front and back surfaces of the hardcopy images are scanned at step 660 and the scanned data is forwarded to computer 604 for processing. Then the information obtained from scanning the front and back of each hardcopy media is associated with its' respective image in step 670. Thus a digital image file is created for each hardcopy media wherein the digital image data is associated with any other related information obtained from scanning the hardcopy media. Examples of related data obtained have been discussed above, for example, but limited to, the shape and size of the hardcopy media, watermark data, photofinishing related data, photofinisher applied data. The digital image files using the obtained related data are then separated by appropriate software in computer 602 into size/shape groups at step 680. At the size/shape verification step 690 the recorded image sizes and formats are compared to the size and shape information stored in the LUTs also stored in computer 602. While in the preferred embodiment the LUTs are stored in computer 604, the LUTs may be stored on another computer or server (not shown) that is accessible by computer 602 over a communication network, such as the internet. If unrecognized sizes or shapes are recorded the size/shape LUT is appended to the digital image file at step 700 to include them. The digital images are then further separated into watermark style groups at step 710. The scanned watermarks, using appropriate software on computer 604, are compared to the watermark style LUT in step 720. Watermark style verification step 730 determines if all of the watermark styles were recognized by the watermark style LUT. If unrecognized watermarks are detected, the watermark style LUT is added to the current LUT to include the new watermark styles in step 760. If any time/date indications are detected they are associated to any matching watermark styles at date/time verification step 770. Note that filenames may be created from detected dates and times, and also that detected writing may be indicated or stored with the image file for the print in question. Watermark style and time/date designations are appended to existing LUTs at step 780. Using the updated LUTs the recorded hardcopy media images are reorganized at step 740. At image comparison and analysis step 750 the non-image determined groupings are further matched, grouped, sorted, and sequenced using image derived organizational information like histogram compassion, eye detection, eye separation, and face detection. At this step an additional image processing such as orientation correction, quality optimization, sharpening, and image error correction operations are performed. An automatically derived user interface based on the organizational structure is prepared at step 640 and a user selected organized image product is created at step 650 by appropriate output device 608. The products produced at step 650 by output device 608 can also include any or all of the following output modalities; CDs/DVDs or Memory Cards, Index Print Sheets, Index Print Albums, a customized photo album, a duplicate set of prints printed in the newly obtained organized sequence and groupings, a website based interactive organized digital image collection, a self contained portable Picture Viewer with internal or wireless access to an interactive organized digital image collection. Note that a user verification step may be added (not shown) where the user can approve the dating and grouping of images and any associated filenames.

As can be seen the process of sorting and grouping of the images may provide additional information with respect to digital images obtained. That is not only is date information obtained, but various other types of information may be obtained from the scanning process. For example, but not limited to, information related to who is in the digitals images, the location or event where the digital images were captured. This information is maintained with the digital images and used to provide additional sorting and grouping of the digital images as desired by user of the system.

Figure 19:
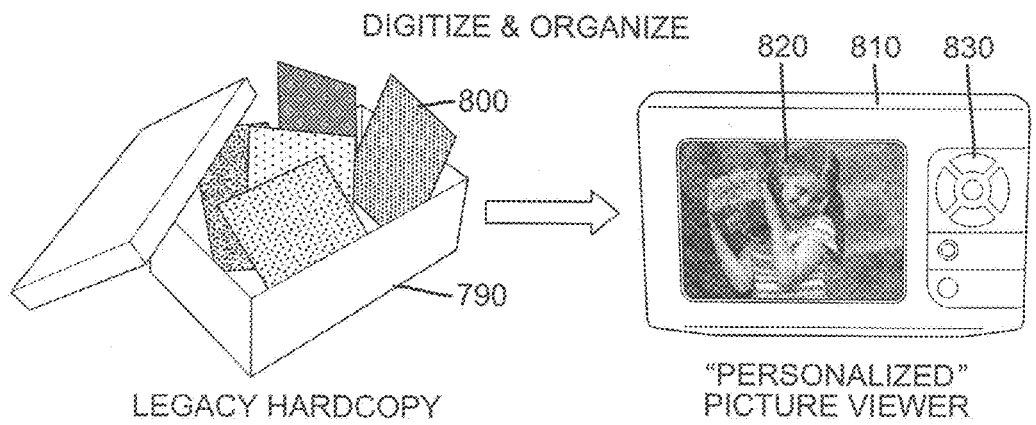
FIG. 19 is an illustration of unorganized assorted hardcopy images converted to organized digital images and stored in a self-contained image storage and viewing device.

FIG. 19 is a graphic illustration of unorganized assorted hardcopy prints/media 800 randomly stored in container 790. The hardcopy media collection is converted to organized digital images and stored in a self-contained image storage and viewing device 810 having a viewable digital image display 820 and user interface 830. With hardcopy media collection 800 organized and stored in viewing device 810, any of the properly oriented and optimized images, can be viewed by group, event, theme, or sequence.

Figure 20:
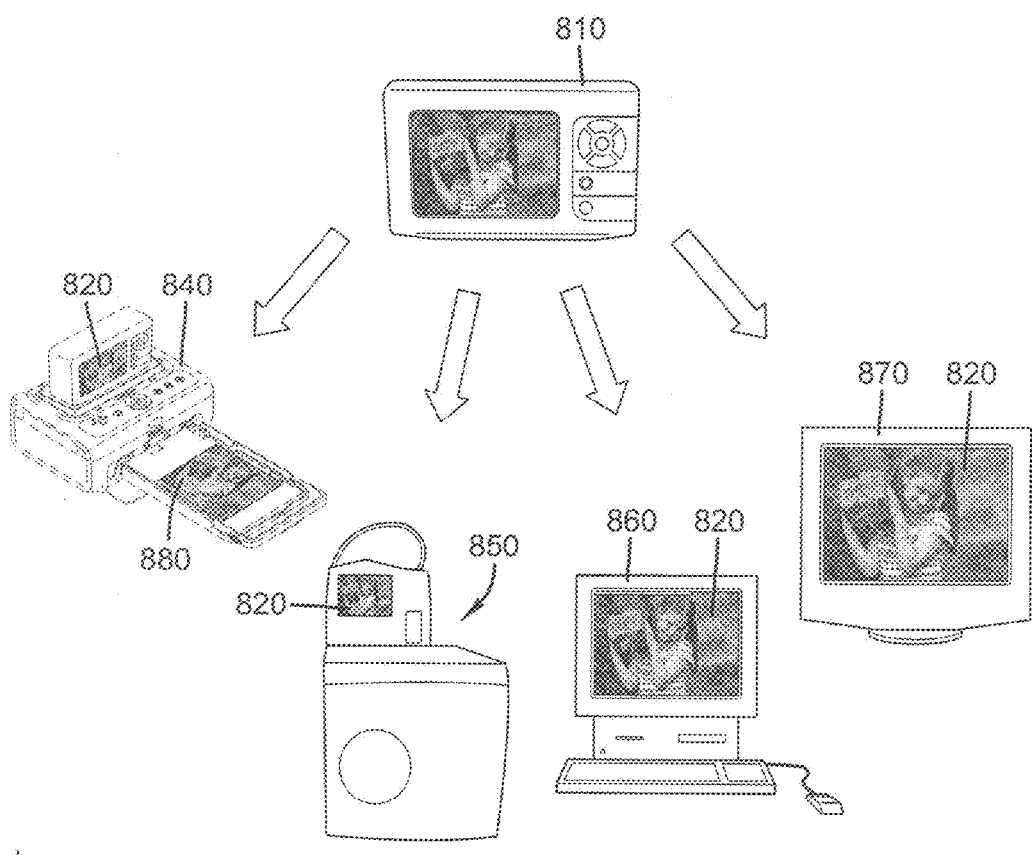
FIG. 20 is an illustration of a self-contained image storage and viewing device being interfacing with other imaging duplication, printing, storage, transmission, and viewing devices.

FIG. 20 is a graphic illustration of a self-contained image storage and viewing device 810 containing an organized digital image collection and having an interface for communicating the organized collection to other devices such as imaging duplication, printing, storage, transmission, and viewing devices. This interface may comprise a physical or wireless connection for communicating with an Image Dock type picture printer 840 having a viewable digital image 820 and producing matching duplicate print 880. The device 810 may also provide viewable digital images on a screen 820 provided on an imaging kiosk 850, personal computer 860 and TV monitor 870.

The invention has been described in detail with particular reference to certain preferred embodiments thereof, but it will be understood that variations and modifications can be effected within the scope of the invention.

Parts List:
10 Unorganized collection of digitized hardcopy media
20 $1^{st}$ subgroup images of bordered 3.5"×3.5" prints
30 $2^{nd}$ subgroup images of borderless 3.5"×5" prints with round corners
40 $3^{rd}$ subgroup images of bordered 3.5"×5" prints
50 $4^{th}$ subgroup images of borderless 4"×6" prints
60 Hardcopy media with a recognized format (size/shape)
65 Hardcopy media with a recognized as "Greeting Card"
70 Hardcopy media non-image surface
80 Manufacturer applied recognized watermark
85 media watermark
90 Coded manufacturer applied recognized watermark
100 Watermark encoding mark (type 1)
102 Watermark encoding mark (type 2)
105 Watermark encoding mark (type. 3)
110 Photofinisher applied ink stamp
120 Photofinisher applied ink stamp date/mark
130 Photofinisher applied ink stamp logo
140 Hardcopy media image surface border
150 Photofinisher applied optically exposed processing date
160 Hardcopy image
162 image
170 Photofinisher applied digital back print (APS format)
180 Camera recorded exposure time
190 Camera recorded exposure date
200 Photofinisher recorded film ID#
210 Photofinisher recorder film frame #
215 Camera exposed film recorded indicia
220 Camera exposed exposure time
230 Camera exposed exposure date
240 Photofinisher applied user-selected seasonal graphic
250 Photofinisher applied user-selected text message
260 Photofinisher applied user-selected name
270 Photofinisher applied user-selected date
280 User applied handwritten date
285 User applied handwritten message
290 Manufacturer applied unrecognized watermark
300 Hardcopy media with an unrecognized format (size/shape)
302 image area
305 Hardcopy media with a recognized shape characteristic
310 Manufacturer applied recognized watermark (sponsorship type)
320 Manufacturer applied recognized watermark (advertisement type)
330 Manufacturer applied recognized watermark (logo/graphic type)
340 Roll of watermarked hardcopy media
350 Roll mounting core
360 Hardcopy media cutter
370 Length of hardcopy media
375 Individual hardcopy prints
380 Hardcopy media image with a recognized format short advance length
382 arrows
384 arrows
390 Hardcopy media image with a recognized format long advance length
392 arrows
394 arrows
400 Randomized sequence of hardcopy media with matching watermark styles
410 Rearranged sequence of hardcopy media with aligned watermark sections
420 Recreated original printing sequence
430 Photofinishing order bag
440 Photofinishing lab/retailer designation
450 User applied handwritten name
460 User applied handwritten date
470 User applied handwritten phone #
480 User applied handwritten print size/format designation
490 User applied handwritten film type designation
500 Photofinishing order bag sequence number
510 Print return envelope
520 Copy restrictive print media
530 "Yellow dot" copy restrictive indicator
540 Professional photo studio logo
550 Hardcopy media index print
560 Photofinisher applied processing date
570 Photofinisher applied machine-readable order number
575 Photofinisher applied eye-readable order number
580 Index image
590 Designated frame or image number
600 Method flowchart
602 scanner
604 computer
608 output device
610 Prepare to scan step
620 Media grouping decision step
630 Maintain existing group structure step
635 Scan front and back surfaces of the hardcopy media step
640 Prepare automatically derived user interface step
650 Create organized image product step
660 Scan front and back surfaces of the hardcopy media step
665 Scan front and back surfaces of the hardcopy media step
670 Associate front and back image step
680 Separate digital images into size/shape groups step
690 Size/shape verification step
700 Append size/shape LUT step
710 Separate digital images into watermark style groups step
720 Compare scanned watermarks to watermark style LUT step 730 Watermark style verification step
740 Reorganization step
750 Image comparison and analysis step
760 Append watermark style LUT step
770 Time/date verification step
780 Append watermark style date designation step
790 Hardcopy media container
800 Unorganized hardcopy media collection
810 Self-contained digital media storage and presentation device
820 Viewable digital image
830 User interface
840 Dock type picture printer
850 Imaging kiosk
860 Personal computer
870 TV monitor
880 Duplicate hardcopy print

The invention claimed is:

1. A method for automatically organizing digital images obtained from a plurality of hardcopy media, each having front, image, and back, non-image, sides, that have been digitally scanned so as to obtain said digital images, comprising the steps of:
   a. scanning both the front image side and the back non-image side of said plurality of hardcopy media so as to obtain a digital record of images on said front image side and any manufacturer's watermark present on said back non-image side at the time of manufacture of the hardcopy media;
   b. storing data related to the manufacturer's watermark; and
   c. using the stored data related to said manufacturer's watermark on said back non-image side for automatically organizing said digital images, wherein the manufacturer's watermark is indicative of a characteristic of the hardcopy media at the time of manufacture.

2. The method according to claim 1 wherein said organizing said digital images comprises grouping said digital images in to groups of images taken at about the same time period.

3. The method according to claim 2 wherein said organizing said digital images into said groupings where said time periods are characterized by time period of manufacture of media as characterized by dates of manufacture of said watermark.

4. The method according to claim 2 wherein said digital images in at least one of said groups is further organized by the sequence in which they were captured.

5. The method according to claim 1 wherein said manufacturer's watermark can be differentiated by any of the following:
   color;
   pattern;
   orientation;
   distinctive marking; or
   style.

6. The method according to claim 1 wherein said organizing further includes analyzing other characteristics of the hardcopy media so as to obtain additional information that can be used for organizing said digital images.

7. The method according to claim 5 wherein said other characteristics comprising any one of the following:
   date stamp;
   time stamp;
   a physical characteristic of the hardcopy media;
   color characteristics (e.g. histogram);
   size of said hardcopy media;
   shape of said hardcopy media;
   photofinisher marking; or
   format of the image.

8. The method according to claim 6 wherein optical character recognition software is used to obtain said additional information.

9. The method according to claim 1 further comprising the step of obtaining additional information that can be used for grouping or sorting of said digital images from items related to said hardcopy media.

10. The method according to claim 9 wherein said additional information is obtained from scanning any one of the following:
    index print;
    photofinishing envelope; or
    information obtained from photographic film.

11. The method according to claim 1 wherein said step of using the data related to said manufacturer's watermark on said back non-image side for organizing said digital images includes comparing said manufacturer's watermark obtained by said scanning with a LUT having the stored data regarding various known manufacturer's watermarks.

12. The method according to claim 11 wherein said data can be used for sorting or grouping of said digital images.

13. The method according to claim 11 wherein if said scanned manufacturer's watermark is not present in said LUT, then adding said scanned manufacturer's watermark to said LUT.

14. The method according to claim 13 wherein when additional data are obtained with respect to said added manufacturer's watermark obtained through a later analysis and then associating these data with all said digital images having said added manufacturer's watermark.

15. The method according to claim 1 wherein said manufacturer's watermark includes a coded mark.

16. The method according to claim 1 wherein using the data related to said manufacturer's watermark on said back non-image side for automatically organizing said digital images comprising using the orientation or style of said manufacturer's watermark.

17. A system for organizing digital images obtained from a plurality of hardcopy media, comprising:
    a. scanner for scanning both the front image side and back non-image sides of said plurality of hardcopy media so as to obtain a digital record of images on said front image side and any manufacturer's watermark present on said back non-image side at the time of manufacture of the hardcopy media;
    b. a computer having a memory for storing data related to the manufacturer's watermark; and
    c. the computer also having a software program for use in analyzing the data related to said manufacturer's watermark on said back non-image side of said plurality of hardcopy media for automatically organizing said digital images, wherein the manufacturer's watermark is indicative of a characteristic of the hardcopy media at the time of manufacture.

18. The system according to claim 17 wherein said organizing said digital images comprises grouping said digital images in to groups of images taken at about the same time period.

19. The system according to claim 18 wherein said organizing said digital images into said groupings where said time periods are characterized by time period of manufacture of media as characterized by dates of manufacture of said manufacturer's watermark.

20. The system according to claim 18 wherein said digital images in at least one of said groups is further organized by the sequence in which they were captured.

21. The system according to claim 17 wherein said manufacturer's watermark can be differentiated by any of the following:
- color;
- pattern;
- orientation;
- distinctive marking; or
- style.

22. The system according to claim 17 wherein said organizing further includes analyzing other characteristics of the hardcopy media so as to obtain additional data that can be used for organizing said digital images.

23. The system according to claim 22 wherein said other characteristics comprising any one of the following:
- date stamp;
- time stamp;
- a physical characteristic of the hardcopy media;
- color characteristics (e.g. histogram);
- size of said hardcopy media;
- shape of said hardcopy media;
- photofinisher stamp; or
- format of the image.

24. The system according to claim 22 wherein optical character recognition software is used to obtain said additional data.

25. The system according to claim 17 further comprising the step of obtaining additional data that can be used for grouping or sorting of said digital images from items related to said hardcopy media.

26. The system according to claim 24 wherein said additional data are obtained from scanning any one of the following:
- index print;
- photofinishing envelope; or
- information obtained from photographic film.

27. The system according to claim 17 wherein said step of using the data related to said manufacturer's watermark on said back non-image side for organizing said digital images includes comparing said manufacturer's watermark obtained by said scanning with a LUT having stored data regarding various known manufacturer's watermarks.

28. The system according to claim 27 wherein said information can be used for sorting or grouping of said digital images.

29. The system according to claim 27 wherein if said scanned manufacturer's watermark is not present in said LUT, then adding said scanned manufacturer's watermark to said LUT.

30. The system according to claim 29 wherein additional data are obtained with respect to said added manufacturer's watermark obtained through a later analysis and then associating this data with all said digital images having said added manufacturer's watermark.

31. The system according to claim 17 wherein said manufacturer's watermark includes a coded mark.

32. The system according to claim 17 wherein using said manufacturer's watermark on said back non-image side for automatically organizing said digital images comprising using the orientation or style of said manufacturer's watermark.

33. The system according to claim 17 further comprising an output device for producing a product incorporating said organized digital images.

34. The system according to claim 33 wherein said product comprises any one of the following:
- digital storage media;
- picture album;
- index print; or
- computer file.

35. The system according to claim 34 wherein said digital storage media comprises any one of the following:
- CD;
- DVD;
- flash card;
- display device;
- embedded hard drive; or
- removable hard drive.

* * * * *